(12) United States Patent
Yoshida et al.

(10) Patent No.: US 11,603,157 B2
(45) Date of Patent: Mar. 14, 2023

(54) VEHICLE

(71) Applicant: YAMAHA HATSUDOKI KABUSHIKI KAISHA, Iwata (JP)

(72) Inventors: Masahiro Yoshida, Shizuoka (JP); Kenta Higashiyama, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 254 days.

(21) Appl. No.: 17/063,737

(22) Filed: Oct. 6, 2020

(65) Prior Publication Data
US 2021/0122437 A1    Apr. 29, 2021

(30) Foreign Application Priority Data
Oct. 25, 2019    (JP) .............................. JP2019-194612

(51) Int. Cl.
| | |
|---|---|
| *B62J 35/00* | (2006.01) |
| *B62J 37/00* | (2006.01) |
| *B62K 5/027* | (2013.01) |
| *B62K 5/06* | (2006.01) |
| *B60N 2/24* | (2006.01) |
| *B01D 53/04* | (2006.01) |
| *B62K 21/12* | (2006.01) |

(52) U.S. Cl.
CPC .......... *B62J 35/00* (2013.01); *B01D 53/0415* (2013.01); *B01D 53/0446* (2013.01); *B60N 2/24* (2013.01); *B62K 5/027* (2013.01); *B62K 5/06* (2013.01); *B62K 21/12* (2013.01); *B01D 2259/40086* (2013.01); *B01D 2259/4516* (2013.01)

(58) Field of Classification Search
CPC ....... B62J 35/00; B62J 37/00; B01D 53/0446; B01D 2259/40086; B01D 2259/4516; B62K 5/027
See application file for complete search history.

(56) References Cited

U.S. PATENT DOCUMENTS

| | | | | |
|---|---|---|---|---|
| 7,228,850 | B2 * | 6/2007 | King | F02M 25/0854 123/519 |
| 8,215,290 | B2 * | 7/2012 | Dunkle | F02M 33/08 123/518 |
| 8,459,240 | B2 * | 6/2013 | Lee | B01D 53/0415 123/518 |
| 10,315,511 | B2 * | 6/2019 | Hayashi | B60K 15/03519 |
| 11,072,234 | B2 * | 7/2021 | Takata | B60K 15/03504 |
| 2006/0016436 | A1 * | 1/2006 | Groom | F02M 25/08 123/520 |
| 2006/0196481 | A1 * | 9/2006 | Mills | F02M 25/089 123/519 |
| 2007/0034193 | A1 * | 2/2007 | King | F02M 25/089 123/519 |

(Continued)

FOREIGN PATENT DOCUMENTS

JP    2021066386 A * 4/2021 ......... B01D 53/0415

*Primary Examiner* — Barry Gooden, Jr.
(74) *Attorney, Agent, or Firm* — Keating and Bennett, LLP

(57) ABSTRACT

A vehicle includes an engine, at least three wheels including a front wheel and a rear wheel, a fuel tank above the engine, a seat rearward of the fuel tank, a canister positioned lower than the fuel tank, and a vent hose to supply air therethrough into the canister to desorb the adsorbed fuel evaporative emission from the canister. An upstream end of the drain hose is connected to the vent hose. A downstream end of the drain hose is positioned lower than the canister.

13 Claims, 14 Drawing Sheets

(56) References Cited

U.S. PATENT DOCUMENTS

| | | | |
|---|---|---|---|
| 2007/0267064 A1* | 11/2007 | Greene | F16K 17/36 137/202 |
| 2010/0037869 A1* | 2/2010 | Lee | B60K 15/03519 123/519 |
| 2010/0051369 A1* | 3/2010 | Kuramochi | B62J 35/00 123/519 |
| 2010/0126476 A1* | 5/2010 | Hidano | F02M 37/0082 123/519 |
| 2010/0242925 A1* | 9/2010 | Yoshida | F02M 25/0872 123/519 |
| 2010/0243353 A1* | 9/2010 | Inaoka | B60K 13/02 180/68.3 |
| 2010/0243355 A1* | 9/2010 | Hosoya | B62J 37/00 123/520 |
| 2011/0011264 A1* | 1/2011 | Makino | F02M 25/0872 96/144 |
| 2011/0073399 A1* | 3/2011 | Seki | B60K 15/03504 60/299 |
| 2011/0100742 A1* | 5/2011 | Shibata | F02M 25/0854 180/219 |
| 2011/0284307 A1* | 11/2011 | Mori | B62J 37/00 29/428 |
| 2012/0073549 A1* | 3/2012 | Lee | B01D 53/0415 123/520 |
| 2012/0247433 A1* | 10/2012 | Ozaki | F02M 25/089 123/519 |
| 2016/0187890 A1* | 6/2016 | Borkowski | G05D 9/12 137/78.1 |
| 2016/0229476 A1* | 8/2016 | Yasuta | B62J 35/00 |
| 2017/0089303 A1* | 3/2017 | Kurata | F02M 25/0872 |
| 2017/0144536 A1* | 5/2017 | Kim | F02M 25/0854 |
| 2017/0334285 A1 | 11/2017 | Tanaka | |
| 2019/0202516 A1* | 7/2019 | Yamamoto | B62J 15/00 |
| 2019/0353121 A1* | 11/2019 | Mills | F02D 41/004 |
| 2020/0140030 A1* | 5/2020 | Ishii | B62K 11/04 |
| 2021/0245135 A1* | 8/2021 | Ruettinger | F02M 25/0854 |
| 2022/0112855 A1* | 4/2022 | Kawase | F02D 41/003 |
| 2022/0341377 A1* | 10/2022 | Dudar | B60K 15/05 |
| 2022/0388594 A1* | 12/2022 | Hidai | B62J 35/00 |

\* cited by examiner

VEHICLE

CROSS REFERENCE TO RELATED APPLICATIONS

This application claims the benefit of priority to Japanese Patent Application No. 2019-194612 filed on Oct. 25, 2019. The entire contents of this application are hereby incorporated herein by reference.

BACKGROUND OF THE INVENTION

1. Field of the Invention

The present invention relates to a vehicle that includes a canister to adsorb fuel evaporative emission discharged from a fuel tank.

2. Description of the Related Art

US 2017/334285 A1 discloses an ATV (All Terrain Vehicle) including a canister. FIG. 8 in US 2017/334285 A1 shows that a lower end portion of the canister is disposed below the center of rotation of the front and rear wheels.

In the ATV described in US 2017/334285 A1, the canister is disposed at a low position. This may cause water on the ground and/or water splashing from the wheels, etc. to enter the canister.

SUMMARY OF THE INVENTION

Preferred embodiments of the present invention provide vehicles each including an engine, at least three wheels including a front wheel and a rear wheel, a fuel tank above the engine to contain fuel to be supplied to the engine, a seat rearward of the fuel tank on which a rider sits, a canister positioned lower than the fuel tank to adsorb fuel evaporative emission discharged from the fuel tank, a vent hose to supply the canister with air to desorb the adsorbed fuel evaporative emission from the canister, and a drain hose including an upstream end connected to the vent hose and a downstream end positioned lower than the canister.

According to the above structural arrangement, the fuel tank is positioned above the engine. The fuel evaporative emission discharged from the fuel tank flows into the canister. The fuel evaporative emission is adsorbed by adsorbent in the canister. Thus, it is possible to reduce the fuel evaporative emission released into the atmosphere.

On the other hand, air guided through the vent hose flows into the canister. The fuel evaporative emission adsorbed by the adsorbent in the canister is desorbed from the adsorbent by the supply of the air from the vent hose. The capacity of the canister, that is, the total amount of the fuel evaporative emission adsorbable by the adsorbent is recovered through desorption of the fuel evaporative emission. Therefore, long-term usage of the canister is made possible by desorption of the fuel evaporative emission from the adsorbent.

The vent hose is connected to the canister. Even if the canister is at a low position, the opening of the canister is protected by the vent hose, thus, water is less likely to enter the canister. Therefore, it is possible to reduce the amount of water which enters the canister. Further, even if water enters the vent hose, it is possible to discharge the water into the drain hose.

According to preferred embodiments of the present invention, at least one of the following features may be added to the vehicle.

The engine includes a crank shaft rotatable about a rotation axis in response to combustion of fuel, and the downstream end of the drain hose is lower than the rotation axis of the crank shaft.

The vehicle further includes a frame to which the engine is mounted and a swing arm arranged to vertically swing together with the rear wheel with respect to the frame about a rotation axis extending in a left-right direction, in which the downstream end of the drain hose is lower than the rotation axis of the swing arm.

The vehicle further includes a drain valve attached to the downstream end of the drain hose to discharge fluid that flows out of the drain hose through the downstream end of the drain hose and to prevent fluid from entering the drain hose through the downstream end of the drain hose.

The vehicle further includes a charge hose to guide the fuel evaporative emission discharged from the fuel tank to the canister and a rollover valve on the charge hose to open and close in accordance with a posture of the vehicle, in which the rollover valve is above the fuel tank, and the fuel tank is recessed downward from an upper surface of the fuel tank and includes an upper recessed portion in which at least a portion of the rollover valve is provided.

According to the above structural arrangement, the rollover valve, which is able to open and close in accordance with the posture of the vehicle, is provided on the charge hose. When an inclination angle of the vehicle exceeds an upper limit value, the rollover valve closes, thus, fluid in the charge hose is blocked by the rollover valve. Even if liquid fuel in the fuel tank flows into the charge hose, the liquid fuel is blocked by the rollover valve. Thus, it is possible to prevent the liquid fuel from flowing through the charge hose into the canister.

The rollover valve is above the fuel tank and, in a plan view, overlaps the fuel tank. At least a portion of the rollover valve is in the upper recessed portion of the fuel tank. The upper recessed portion of the fuel tank is recessed downward from the upper surface of the fuel tank. Therefore, it is possible to lower the position of the upper end of the rollover valve in comparison to a case in which an upper recessed portion is not provided. Thus, it is possible to provide the rollover valve while reducing or minimizing the influence on other components.

The upper recessed portion of the fuel tank is recessed downward from the upper surface of the fuel tank as well as recessed inward in the width direction of the vehicle from a side surface of the fuel tank, and at least a portion of the charge hose is in the upper recessed portion.

According to the above structural arrangement, the upper recessed portion of the fuel tank is recessed downward from the upper surface of the fuel tank as well as recessed inward in the width direction of the vehicle from the side surface of the fuel tank. The charge hose, which is positioned to guide the fuel evaporative emission discharged from the fuel tank to the canister, is partially provided in the upper recessed portion. In other words, the space in the upper recessed portion is utilized as a space to accommodate a portion of the charge hose. Thus, it is possible to provide the charge hose while reducing or minimizing the influence on other components.

The rollover valve includes an inflow port through which the fuel evaporative emission flows in and an outflow port through which the fuel evaporative emission that has flowed in the inflow port is discharged, and the inflow port is positioned higher than the outflow port.

According to the above structural arrangement, the inflow port of the rollover valve is positioned higher than the outflow port of the rollover valve. The inflow port of the rollover valve is thus located at a higher position compared to a case in which the inflow port of the rollover valve is lower than the outflow port of the rollover valve. Accordingly, the charge hose is easily laid out such that each portion of the charge hose extends horizontally or upward toward the inflow port of the rollover valve, and thus liquid fuel flowing in the charge hose is less likely to reach the inflow port of the rollover valve.

The charge hose includes a first charge hose extending from the fuel tank to the rollover valve, and a downstream end of the first charge hose is positioned higher than an upstream end of the first charge hose.

According to the above structural arrangement, the first charge hose, which is positioned to guide the fuel evaporative emission therethrough, extends from the fuel tank to the rollover valve. Since the downstream end of the first charge hose is higher than the upstream end of the first charge hose, the first charge hose is easily laid out such that each portion of the first charge hose extends horizontally or upward toward the downstream end of the first charge hose. Accordingly, even if liquid fuel flows into the first charge hose, the liquid fuel is less likely to reach the rollover valve.

The vehicle further includes a charge hose to guide the fuel evaporative emission discharged from the fuel tank to the canister and a rollover valve on the charge hose and to open and close in accordance with a posture of the vehicle, in which the rollover valve includes an inflow port through which the fuel evaporative emission flows in and an outflow port through which the fuel evaporative emission that has flowed in the inflow port is discharged, and the inflow port is positioned higher than the outflow port.

The vehicle further includes a charge hose to guide the fuel evaporative emission discharged from the fuel tank to the canister and a rollover valve on the charge hose and to open and close in accordance with an posture of the vehicle, in which the charge hose includes a first charge hose extending from the fuel tank to the rollover valve, and a downstream end of the first charge hose is positioned higher than an upstream end of the first charge hose.

The vehicle further includes a steering handle to be operated by a rider to steer the vehicle and a cylindrical steering shaft arranged rotatable in response to movement of the steering handle, in which a downstream end of the vent hose is positioned inside of the steering shaft.

According to the above structural arrangement, the downstream end of the vent hose is positioned on the inside of the cylindrical steering shaft that rotates together with the steering handle. The downstream end of the vent hose is protected by the steering shaft that surrounds the downstream end of the vent hose. Small fragments such as pebbles and/or liquid such as rainwater are less likely to enter the vent hose through the downstream end of the vent hose. Thus, it is possible to reduce the amount of liquid and/or solid which enters the vent hose through the downstream end of the vent hose.

The downstream end of the vent hose faces downward on the inside of the steering shaft.

According to the above structural arrangement, the downstream end of the vent hose is not only positioned inside of the steering shaft, but also faces downward on the inside of the steering shaft. Since the downstream end of the vent hose faces downward, even if liquid and/or solid enters the steering shaft, the liquid and/or solid is less likely to enter the vent hose. Thus, it is possible to reduce the amount of liquid and/or solid which enters the vent hose through the downstream end of the vent hose.

The vent hose extends in a through hole that is open at an outer peripheral surface of the steering shaft, and the downstream end of the vent hose is positioned lower than the through hole of the steering shaft.

According to the above structural arrangement, the vent hose extends in the through hole that is open at the outer peripheral surface of the steering shaft. The downstream end of the vent hose is positioned lower than the through hole of the steering shaft. Accordingly, the downstream end of the vent hose faces downward on the inside of the steering shaft. Thus, it is possible to reduce the amount of liquid and/or solid which enters the vent hose through the downstream end of the vent hose.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Unless otherwise noted, a vehicle 1 in a reference posture located on a horizontal surface shall be described below. The reference posture is a posture in which no rider is on the vehicle 1 and a steering handle 7 is disposed in a straight-ahead driving position. A front-rear direction, an up-down direction, and a right-left direction are defined based on the vehicle 1 in the reference posture. The left-right direction corresponds to the vehicle width direction.

A vehicle center WO represents a vertical plane passing through a position at which a space between a pair of wheels opposing each other in the right-left direction (e.g., two rear wheels Wr) is bisected to the right and left. Inward in the vehicle width direction refers to a direction approaching the vehicle center WO. Outward in the vehicle width direction refers to a direction moving away from the vehicle center WO. Unless otherwise noted, a side view, a plan view, and a front view in the following description refer to a side view, a plan view, and a front view of the vehicle 1, respectively.

Figure 1:
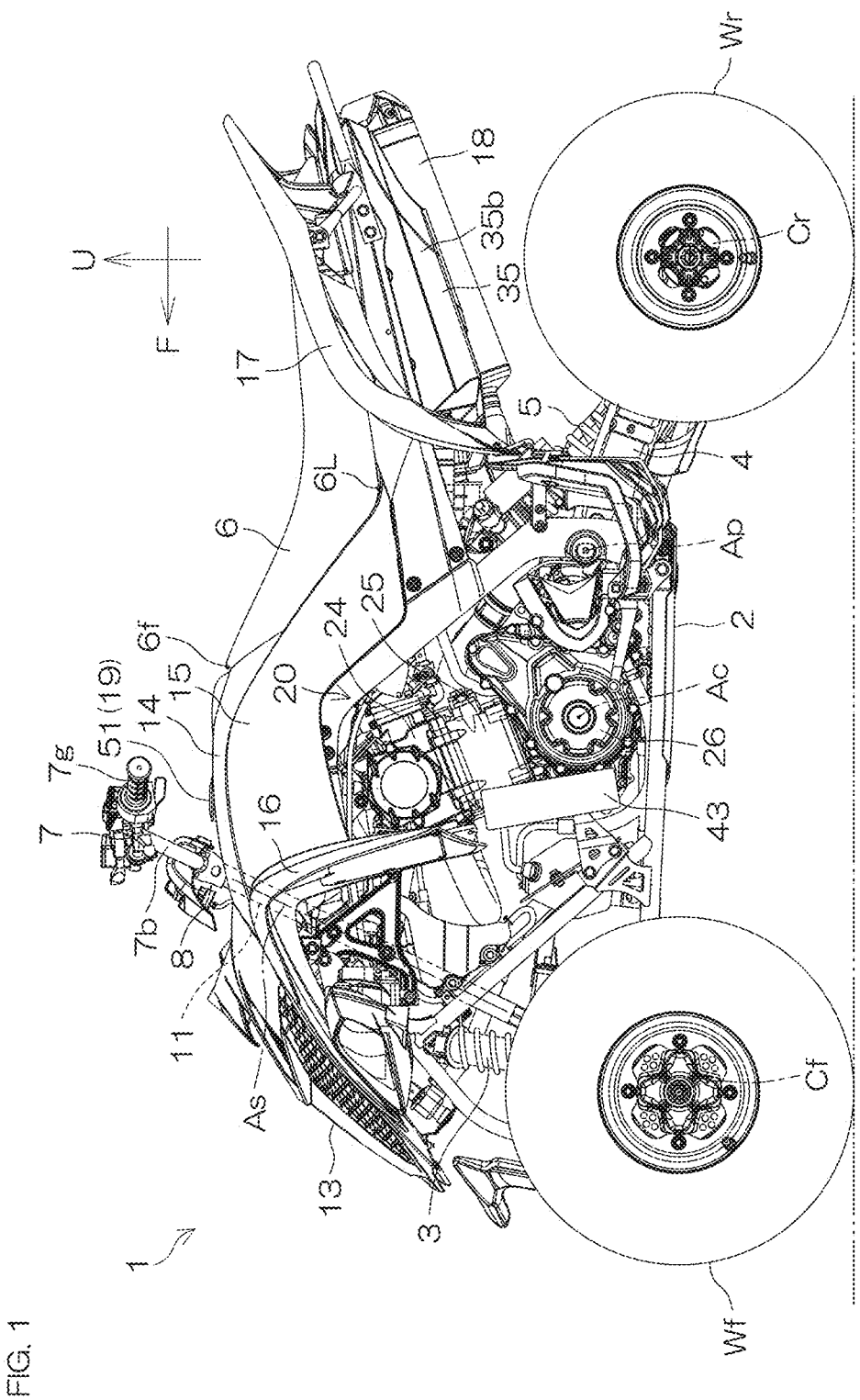
FIG. 1 is a left side view of a vehicle according to a preferred embodiment of the present invention.
Figure 2:
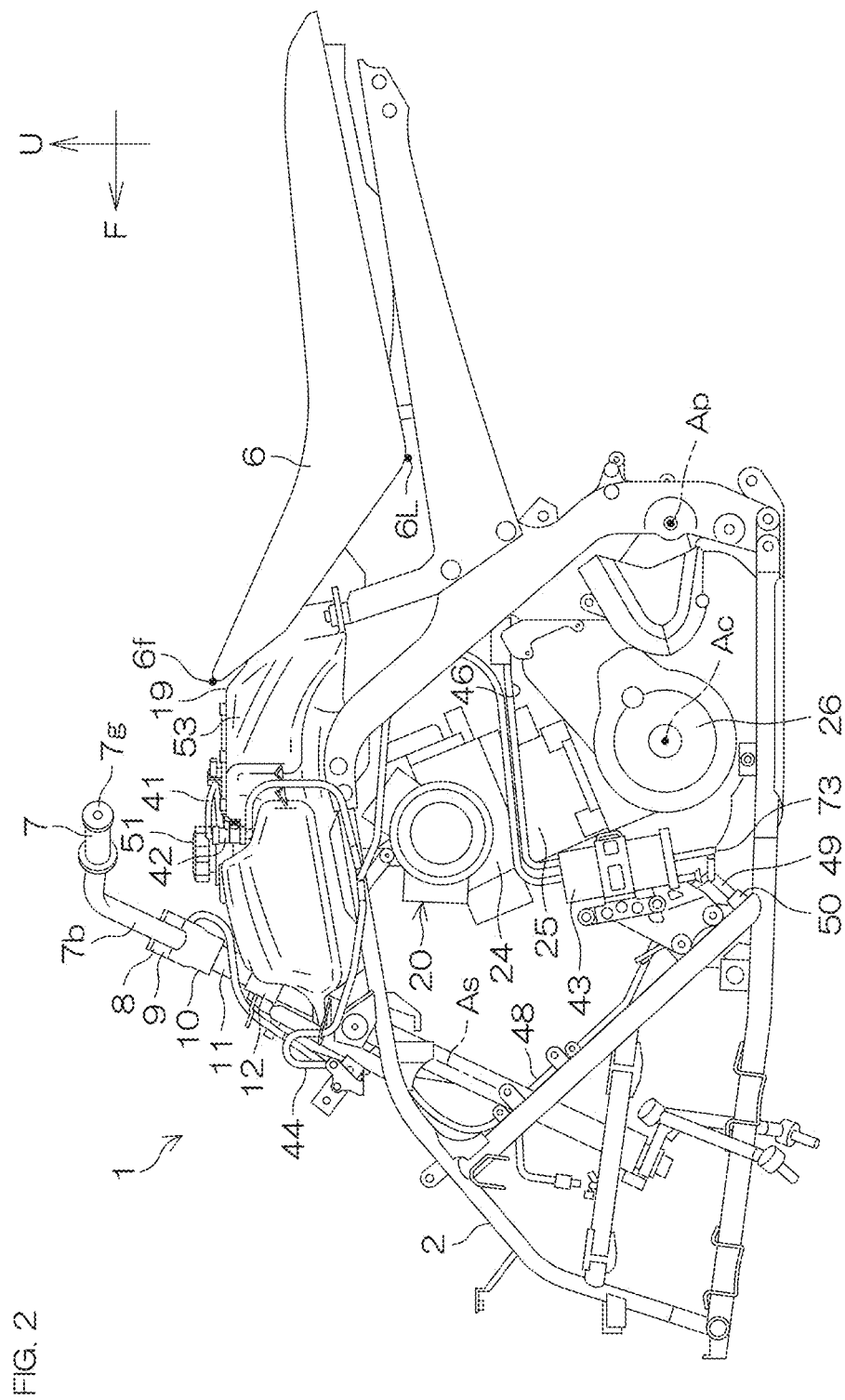
FIG. 2 is a left side view showing a frame, a fuel tank, an engine, etc.
Figure 3:
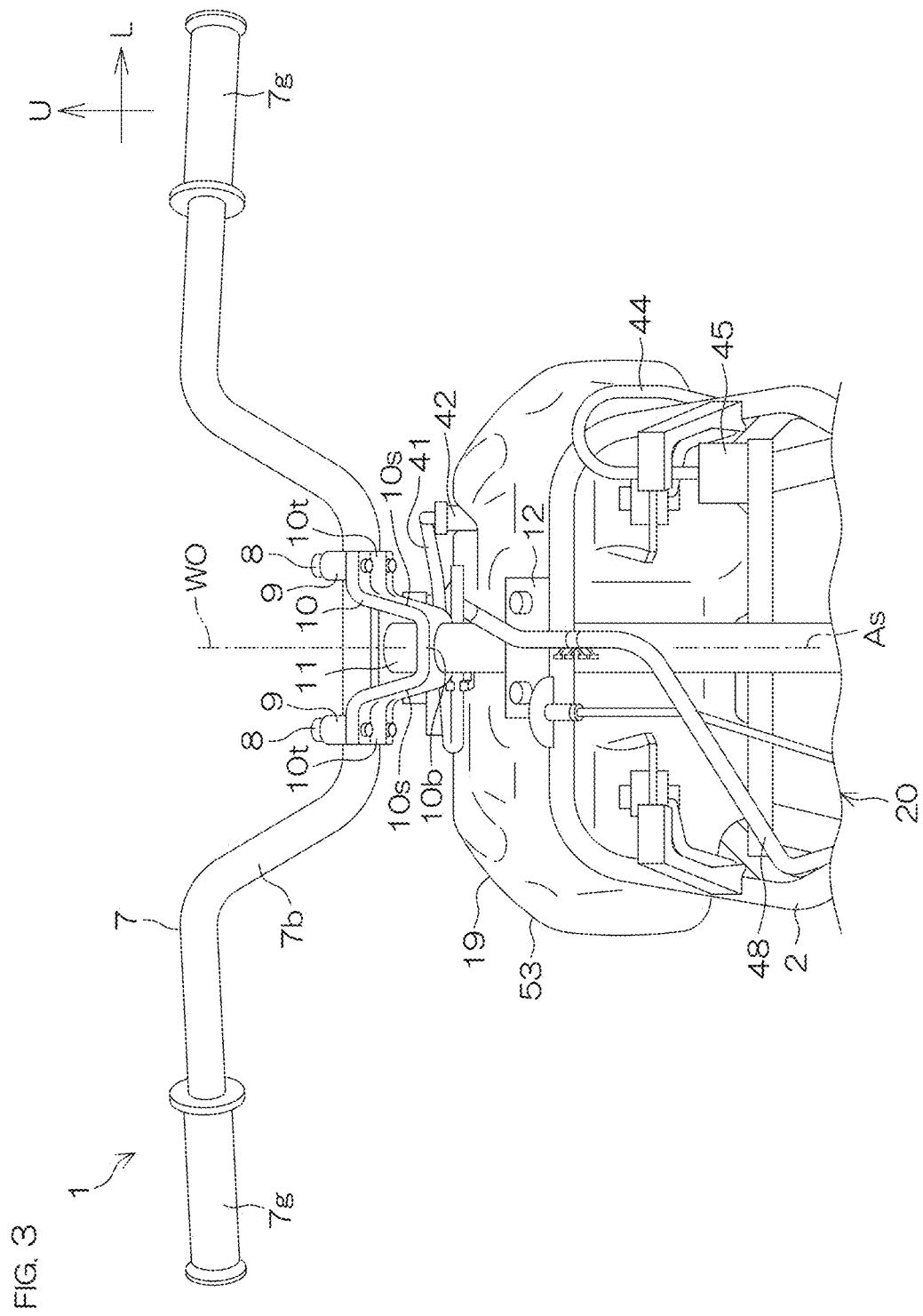
FIG. 3 is a front view showing the frame, a steering handle, the fuel tank, etc.

FIG. 1 is a left side view of the vehicle 1 according to a preferred embodiment of the present invention. FIG. 2 is a left side view showing a frame 2, a fuel tank 19, an engine 20, etc. FIG. 3 is a front view showing the frame 2, the steering handle 7, the fuel tank 19, etc. Arrows U and F in FIGS. 1 and 2 indicate the upper direction and the front direction of the vehicle 1, respectively. An arrow L in FIG. 3 indicates the left direction of the vehicle 1. The same applies to other figures.

FIG. 1 shows an example in which the vehicle 1 is an ATV (All Terrain Vehicle). ATV is a type of off-road vehicle. The vehicle 1 includes the frame 2, a pair of left and right front wheels Wf attached to the frame 2, and a pair of left and right rear wheels Wr attached to the frame 2. The pair of front wheels Wf are opposed to each other in the left-right direction and overlap each other in a side view. The pair of rear wheels Wr are also opposed to each other in the left-right direction and overlap each other in a side view.

The pair of front wheels Wf are disposed to the right and left of the frame 2. The pair of front wheels Wf are each attached to the frame 2 via a suspension frame provided for each of the front wheels Wf. The suspension frame is vertically swingable together with the corresponding front wheel Wf with respect to the frame 2. The pair of rear wheels Wr are each attached to the frame 2 via a corresponding axle and a swing arm 4. The pair of rear wheels Wr are disposed to the right and left of the swing arm 4. An axle is supported by the swing arm 4. The axle horizontally extends in the vehicle width direction. The pair of rear wheels Wr are attached to the respective ends of the axle.

The swing arm 4 is coupled to the frame 2 via a pivot shaft horizontally extending in the left-right direction. The pivot shaft is disposed farther to the front than the front end of the rear wheels Wr. The swing arm 4 is vertically swingable with respect to the frame 2 about a pivot axis Ap corresponding to the center line of the pivot shaft. The pair of rear wheels Wr are vertically swingable together with the axle and the swing arm 4 with respect to the frame 2 about the pivot axis Ap.

A pair of front suspensions 3 are disposed to the right and left of the vehicle center WO. Upper end portions of the front suspensions 3 are attached to the frame 2. Lower end portions of the front suspensions 3 are attached to the suspension frame. Rear suspension 5 overlaps the vehicle center WO. Upper end portion of the rear suspension 5 is attached to the frame 2. Lower end portion of the rear suspension 5 is attached to the swing arm 4. Impacts to be transmitted to the frame 2 are absorbed by the front suspensions 3 and the rear suspension 5.

The vehicle 1 includes a saddle-type seat 6 that a rider straddles and the steering handle 7 to be operated by the rider sitting on the seat 6. The seat 6 is disposed on the frame 2. The seat 6 is supported by the frame 2. The seat 6 is disposed above an air cleaner box 35b. A lower end 6L of the seat 6 is disposed higher than the upper ends of the front wheels Wf and the rear wheels Wr. The steering handle 7 is disposed farther to the front than a front end 6f of the seat 6. When the rider moves the steering handle 7 with respect to the frame 2, the pair of front wheels Wf change their direction. The vehicle 1 is thus steered.

The steering handle 7 may be a bar handle or may be a steering wheel. FIGS. 1 to 3 show an example in which the steering handle 7 is a bar handle. As shown in FIG. 3, in the case of this example, the steering handle 7 includes two handle grips 7g to be gripped by the right and left hands of the rider and a handle bar 7b with the two handle grips 7g attached to the respective end portions thereof.

As shown in FIG. 3, the vehicle 1 includes a steering shaft 11 arranged to rotate in response to movement of the steering handle 7 and a handle bracket 8 that couples the steering handle 7 to the steering shaft 11. The steering shaft 11 is supported by a shaft holder 12 of the frame 2. The steering shaft 11 is rotatable with respect to the frame 2 about a steering axis As corresponding to the center line of the steering shaft 11.

The handle bracket 8 includes two upper brackets 9 disposed above the handle bar 7b and a lower bracket 10 disposed below the handle bar 7b. The upper brackets 9 are fixed to the lower bracket 10 using bolts, for example. The handle bar 7b is vertically sandwiched between the two upper brackets 9 and the lower bracket 10. As a result, the handle bar 7b is fixed to the steering shaft 11.

The lower bracket 10 of the handle bracket 8 includes a bottom plate 10b fixed to the steering shaft 11, two side plates 10s extending upward from the bottom plate 10b, and two top plates 10t extending from the two side plates 10s outward in the vehicle width direction. An upper end portion of the steering shaft 11 is disposed between the two side plates 10s in the vehicle width direction. The two top plates 10t are disposed below the handle bar 7b. The upper brackets 9 are fixed to the top plates 10t using bolts, for example.

As shown in FIG. 2, the steering shaft 11 is inclined in a side view such that the upper end of the steering shaft 11 is positioned farther to the rear than the rear end of the steering shaft 11. The upper end of the steering shaft 11 is disposed higher than the shaft holder 12. The steering handle 7 and the handle bracket 8 are also disposed higher than the shaft holder 12. The lower end of the steering shaft 11 is disposed lower than the shaft holder 12.

As shown in FIG. 1, the vehicle 1 includes the engine 20 arranged to combust fuel such as gasoline to generate power and a driving mechanism arranged to transmit power of the engine 20 to the rear wheels Wr. The vehicle 1 further includes the fuel tank 19 arranged to contain fuel to be supplied to the engine 20 and a silencer 18 arranged to release exhaust gas generated in the engine 20 to the atmosphere. The engine 20 is attached to the frame 2 via a rubber or resin engine mount. The fuel tank 19 and the silencer 18 are also attached to the frame 2. The fuel tank 19 is covered with an exterior cover.

The engine 20 is disposed at a position farther to the rear than a rotation center Cf of the front wheels Wf and farther to the front than a rotation center Cr of the rear wheels Wr in a side view. A crank axis Ac to be described below is disposed farther to the front than the pivot axis Ap. The fuel tank 19 is disposed above the engine 20 and, in a plan view, overlaps the engine 20. The steering handle 7 is disposed above the fuel tank 19 in a side view. The steering shaft 11 is disposed in front of the fuel tank 19. The seat 6 is disposed to the rear of the fuel tank 19.

The exterior cover includes a front cover 13 disposed in front of the steering shaft 11, a top cover 14 disposed above the fuel tank 19, and a pair of side covers 15 disposed, respectively, to the right and left of the fuel tank 19. A tank cap 51 of the fuel tank 19 is exposed at the top cover 14. The exterior cover further includes a pair of front mud guards 16 overlapping the pair of front wheels Wf in a plan view and a pair of rear mud guards 17 overlapping the pair of rear wheels Wr in a plan view. The pair of front mud guards 16 are disposed to the right and left of the front cover 13. The pair of rear mud guards 17 are disposed to the right and left of the seat 6.

Next, the engine 20 and its associated arrangement shall be described.

Figure 4:
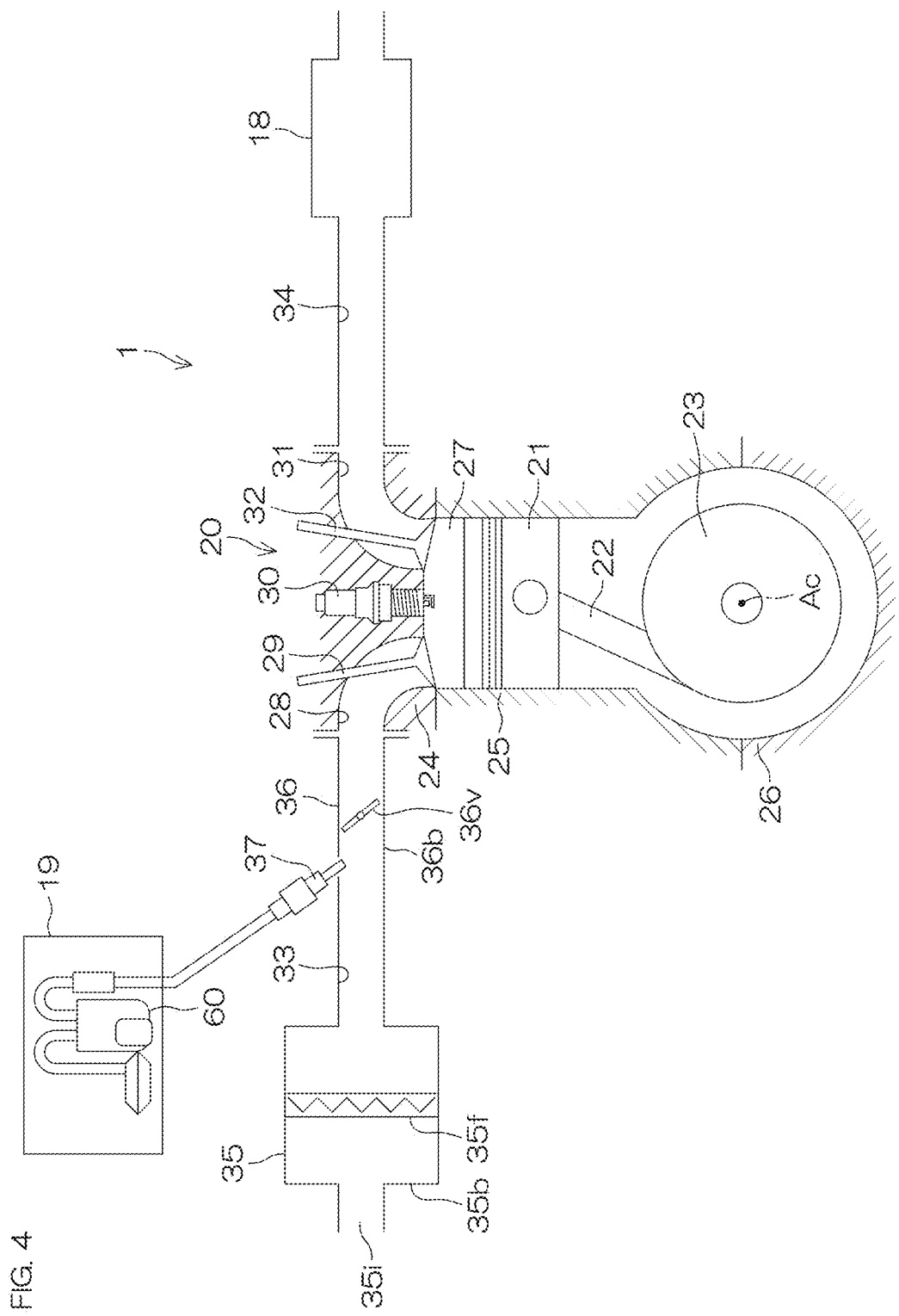
FIG. 4 is a schematic view generally showing the engine included in the vehicle and its associated arrangement.

FIG. 4 is a schematic view generally showing the engine 20 included in the vehicle 1 and its associated arrangement. FIG. 4 shows an example in which the engine 20 is a single-cylinder engine. The engine 20 may be a multi-cylinder engine.

As shown in FIG. 4, the engine 20 includes a piston 21 arranged to reciprocate in response to combustion of an air-and-fuel-containing mixture and a cylinder housing the piston 21. The engine 20 further includes a crank shaft 23 arranged to convert reciprocation of the piston 21 into rotation, a connecting rod 22 arranged to transmit reciprocation of the piston 21 to the crank shaft 23, and a crank case 26 housing the crank shaft 23. The cylinder includes a cylinder body 25 housing the piston 21 and a cylinder head 24 defining, together with the piston 21, a combustion chamber 27 in which an air-fuel mixture is combusted.

An intake port 28 and an exhaust port 31 are open at the inner surface of the combustion chamber 27. The intake port 28 is opened/closed by an intake valve 29. The exhaust port 31 is opened/closed by an exhaust valve 32. A spark plug 30 arranged to ignite an air-fuel mixture in the combustion chamber 27 is inserted in the cylinder head 24. Air is supplied through the intake port 28 into the combustion chamber 27. Exhaust gas is discharged from the combustion chamber 27 through the exhaust port 31.

The vehicle 1 includes an intake passage 33 arranged to guide air to be supplied to the combustion chamber 27 and an exhaust passage 34 arranged to guide the exhaust gas discharged from the combustion chamber 27. The vehicle 1 further includes an air cleaner 35 arranged to remove foreign matter from air flowing through the intake passage 33 toward the combustion chamber 27, a throttle valve 36 arranged to change the flow rate of air to be supplied to the combustion chamber 27, and a fuel supplier 37 arranged to supply fuel from the fuel tank 19 to the intake passage 33 or the combustion chamber 27. The fuel supplier 37 may be either a carburetor or an injector. FIG. 4 shows an example in which the fuel supplier 37 is an injector and supplies fuel to the throttle valve 36.

The air cleaner 35 includes the air cleaner box 35b defining a portion of the intake passage 33. An air filter 35f arranged to remove foreign matter from air is contained in the air cleaner box 35b. Air enters the air cleaner box 35b through an intake opening 35i that is open at the outer surface of the air cleaner box 35b to pass through the air filter 35f. The air then flows from the air cleaner box 35b toward the throttle valve 36. The throttle valve 36 includes a throttle body 36b defining a portion of the intake passage 33 and a valve member 36v disposed in the throttle body 36b. When the valve member 36v moves, the flow rate of air flowing from the throttle valve 36 into the combustion chamber 27 changes accordingly.

Air enters the air cleaner box 35b through the intake opening 35i of the air cleaner 35 and flows from the air cleaner box 35b toward the throttle body 36b. In the example shown in FIG. 4, air and fuel are mixed in the throttle body 36b to make an air-and-fuel-containing mixture. The air-and-fuel-containing mixture is combusted in the combustion chamber 27. When the air-fuel mixture is combusted, the piston 21 reciprocates in the cylinder and thus the crank shaft 23 rotates about the crank axis Ac. The exhaust gas generated through combustion of the air-fuel mixture is discharged from the combustion chamber 27 into the exhaust passage 34 and released through the silencer 18, which defines a portion of the exhaust passage 34, into the atmosphere.

Next, the evaporation system shall be described.

Figure 5:
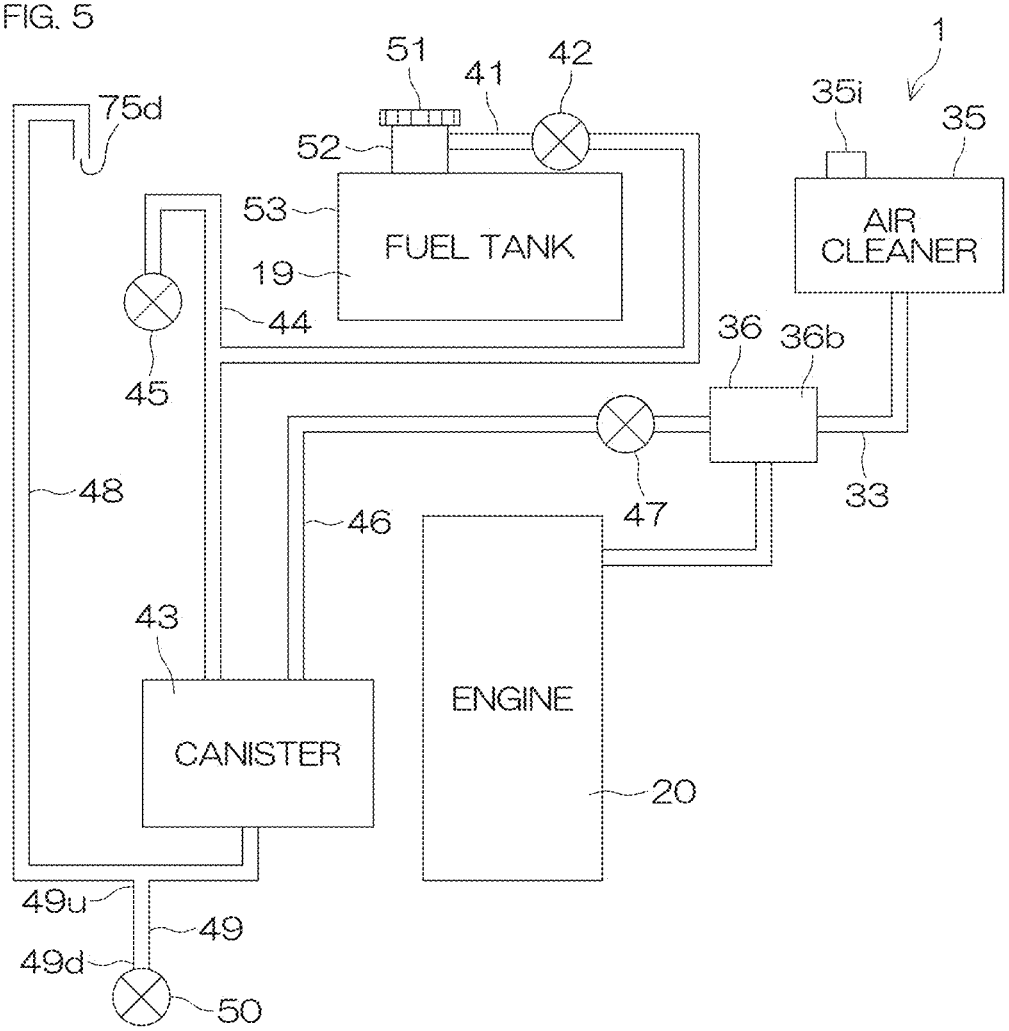
FIG. 5 is a schematic view showing an evaporation system included in the vehicle.

FIG. 5 is a schematic view showing the evaporation system included in the vehicle 1.

As shown in FIG. 5, the vehicle 1 includes the evaporation system arranged to reduce the fuel evaporative emission to be discharged into the atmosphere. The evaporation system includes a canister 43 arranged to adsorb the fuel evaporative emission discharged from the fuel tank 19.

When the liquid fuel in the fuel tank 19 evaporates, the fuel evaporative emission containing fuel vapor is generated. The fuel tank 19 is connected to the canister 43 via a charge hose 41. The fuel evaporative emission in the fuel tank 19 is discharged into the charge hose 41 to flow into the canister 43. The canister 43 contains adsorbent such as activated carbon therein. The fuel evaporative emission is adsorbed by the adsorbent in the canister 43.

The fuel evaporative emission with reduced fuel concentration is discharged into a vent hose 48 that is connected to the canister 43. Some of the fuel evaporative emission discharged into the vent hose 48 is discharged from the vent hose 48 into the atmosphere. The remainder of the fuel evaporative emission discharged into the vent hose 48 flows into a drain hose 49, which is branched from the vent hose 48, and is released into the atmosphere through a drain valve 50 attached to the tip of the drain hose 49. Thus, it is possible to reduce the fuel evaporative emission into the atmosphere.

The canister 43 is connected to the intake passage 33 through a purge hose 46. FIG. 5 shows an example in which the purge hose 46 extends from the canister 43 to the throttle valve 36. The purge hose 46 is opened/closed by a purge cut valve 47 disposed on the purge hose 46. The purge cut valve 47 may be a solenoid valve arranged to open/close in accordance with instructions from an ECU (Electronic Control Unit) or may be a one-way valve arranged to cause fluid to pass only through the intake passage 33.

When the intake valve 29 (see FIG. 4) opens while the piston 21 (see FIG. 4) is moving toward the bottom dead center, the air pressure in the intake passage 33 falls below the atmospheric pressure. When the purge cut valve 47 is open while the intake passage 33 has a negative air pressure, suction force that sucks gas toward the intake passage 33 is applied to the purge hose 46, the canister 43, and the vent hose 48. As a result, air is sucked into the vent hose 48 to flow into the canister 43. The air in the canister 43 is then sucked into the purge hose 46 to flow into the intake passage 33.

The fuel evaporative emission adsorbed by the adsorbent in the canister 43 is desorbed from the adsorbent by the air flowing toward the purge hose 46 and discharged, together with the air, from the canister 43 into the purge hose 46. As a result, the fuel evaporative emission desorbed from the adsorbent is supplied into the combustion chamber 27 of the engine 20. Further, the capacity of the canister 43, that is, the total amount of the fuel evaporative emission adsorbable by the adsorbent is recovered through desorption of the fuel evaporative emission. Therefore, long-term usage of the canister 43 is made possible by desorption of the fuel evaporative emission from the adsorbent.

A relief hose 44 is branched from the charge hose 41. A relief valve 45 is attached to the tip of the relief hose 44. The relief hose 44 extends from the charge hose 41 to the relief valve 45. The fuel evaporative emission in the relief hose 44 is blocked by the relief valve 45. On the other hand, ambient air flows through the relief valve 45 into the relief hose 44, the charge hose 41, and the fuel tank 19.

The drain hose 49 is branched from the vent hose 48. The drain valve 50 is attached to the tip of the drain hose 49. The drain hose 49 extends from the vent hose 48 to the drain valve 50. The drain valve 50 is a one-way valve, for example. Fluid flowing from the drain hose 49 into the drain valve 50 passes the drain valve 50 to be discharged through the drain valve 50. When the fluid tries to flow through the drain valve 50 into the drain hose 49, the drain valve 50 closes to block the fluid.

When liquid flows into the vent hose 48, the liquid in the vent hose 48 flows down to the drain hose 49. The liquid flows from the drain hose 49 down to the drain valve 50 to be discharged therefrom. Thus, it is possible to discharge liquid in the vent hose 48 and the drain hose 49 from the vent hose 48 and the drain hose 49. When fluid such as liquid and/or gas tries to flow through the drain valve 50 into the drain hose 49, the drain valve 50 closes to block the fluid. Thus, it is possible to prevent such liquid and gas from entering the drain hose 49 through the drain valve 50.

The vehicle 1 includes a rollover valve 42 arranged to open and close in accordance with an inclination angle of the vehicle 1 with respect to the vertical direction. When the inclination angle of the vehicle 1 exceeds an upper limit value (e.g., 45 degrees), the rollover valve 42 closes, while when the inclination angle of the vehicle 1 decreases to be equal to or lower than the upper limit value, the rollover valve 42 opens. The rollover valve 42 is disposed on the charge hose 41. The relief hose 44 is branched from the charge hose 41 downstream of the rollover valve 42.

Since the rollover valve 42 is open when the inclination angle of the vehicle 1 is lower than the upper limit value, the fuel evaporative emission passes through the rollover valve 42 to flow into the canister 43. Since the rollover valve 42 closes when the inclination angle of the vehicle 1 exceeds the upper limit value, even if liquid fuel in the fuel tank 19 flows into the charge hose 41, the liquid fuel is blocked by the rollover valve 42. Thus, it is possible to prevent the liquid fuel from flowing through the charge hose 41 into the canister 43.

Next, the evaporation system and its associated arrangement shall be described in detail.

Figure 6:
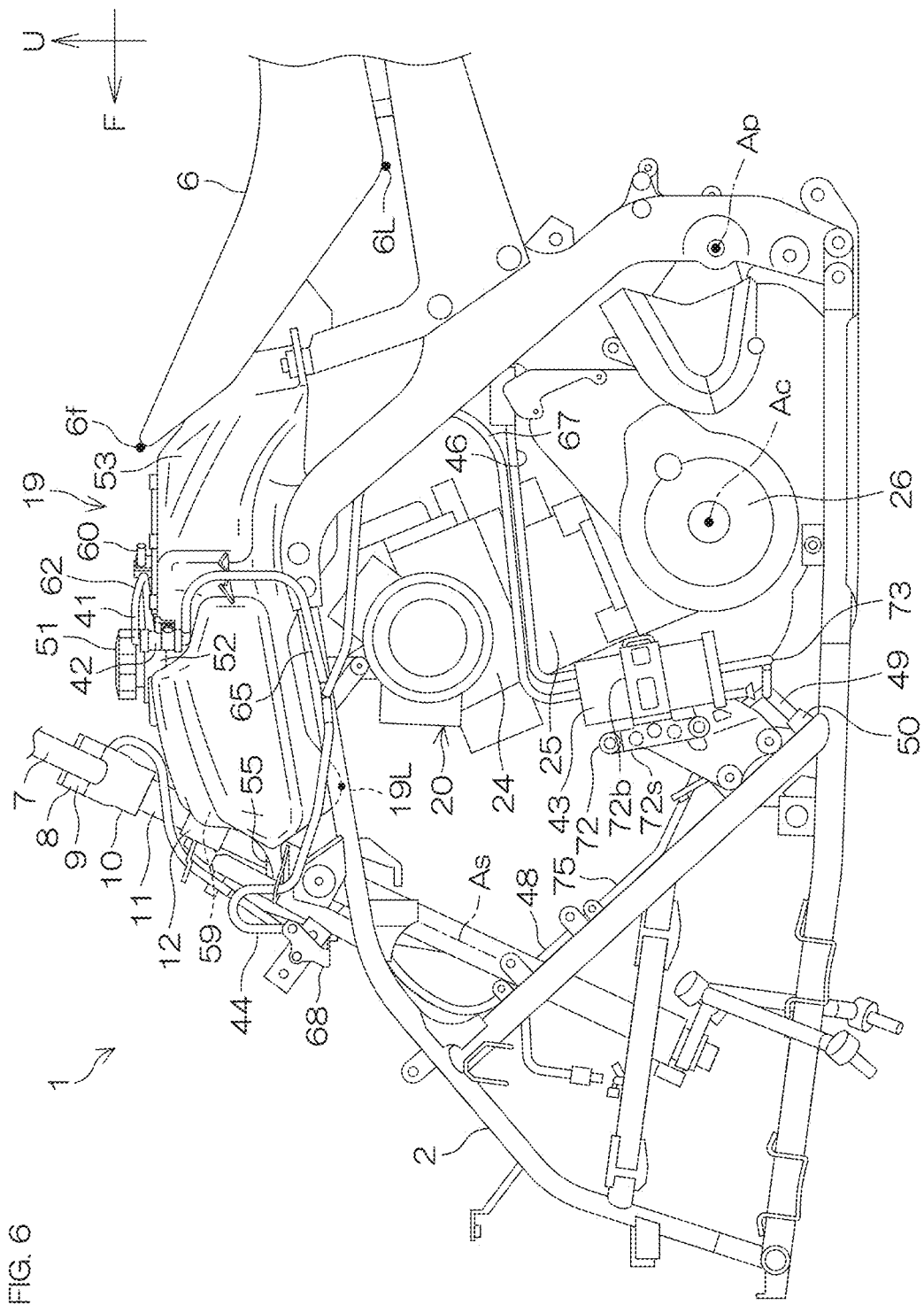
FIG. 6 is a left side view showing the frame, the fuel tank, the engine, etc.
Figure 7:
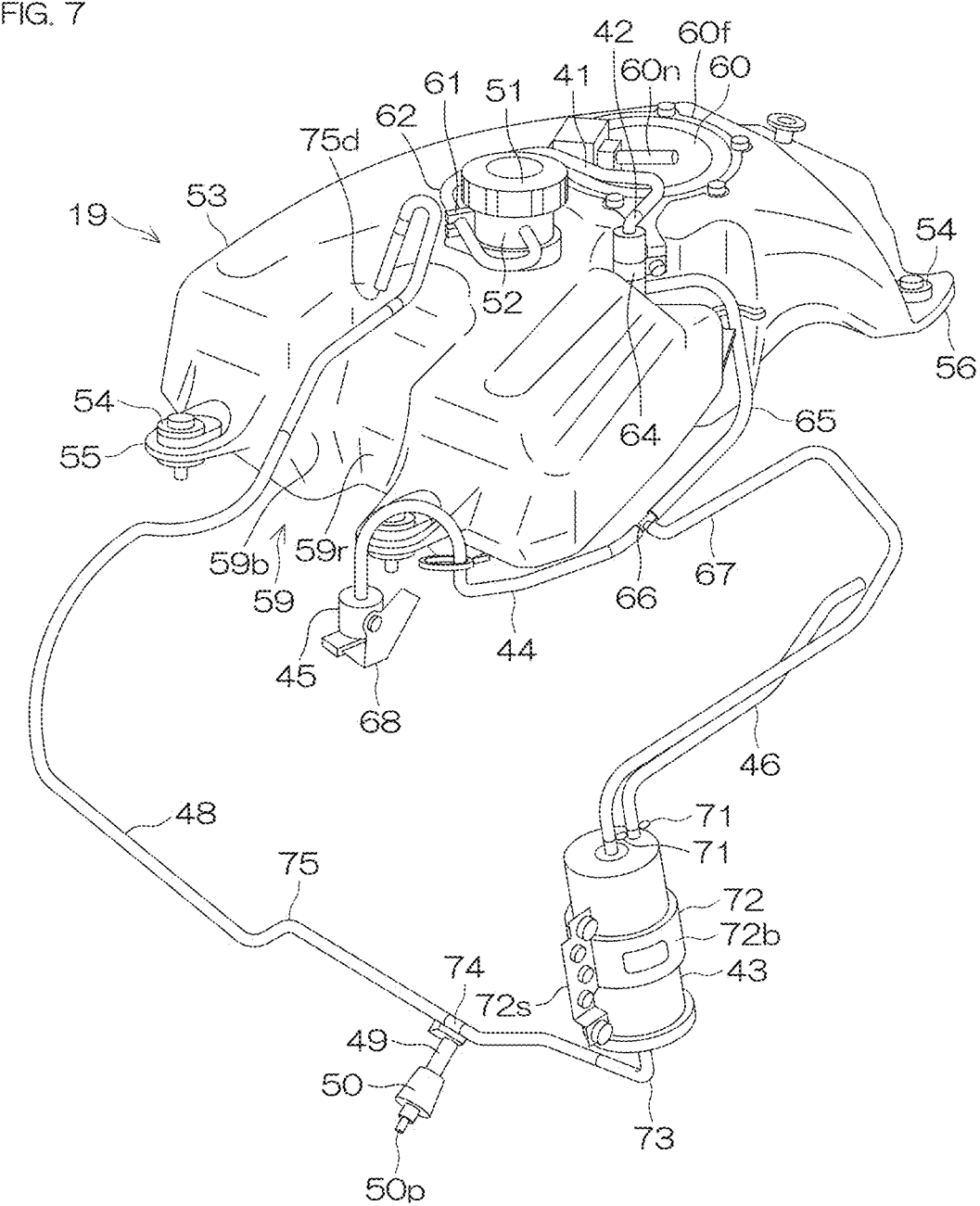
FIG. 7 is a perspective plan view seen obliquely from the front showing the fuel tank, a canister, etc.
Figure 8:
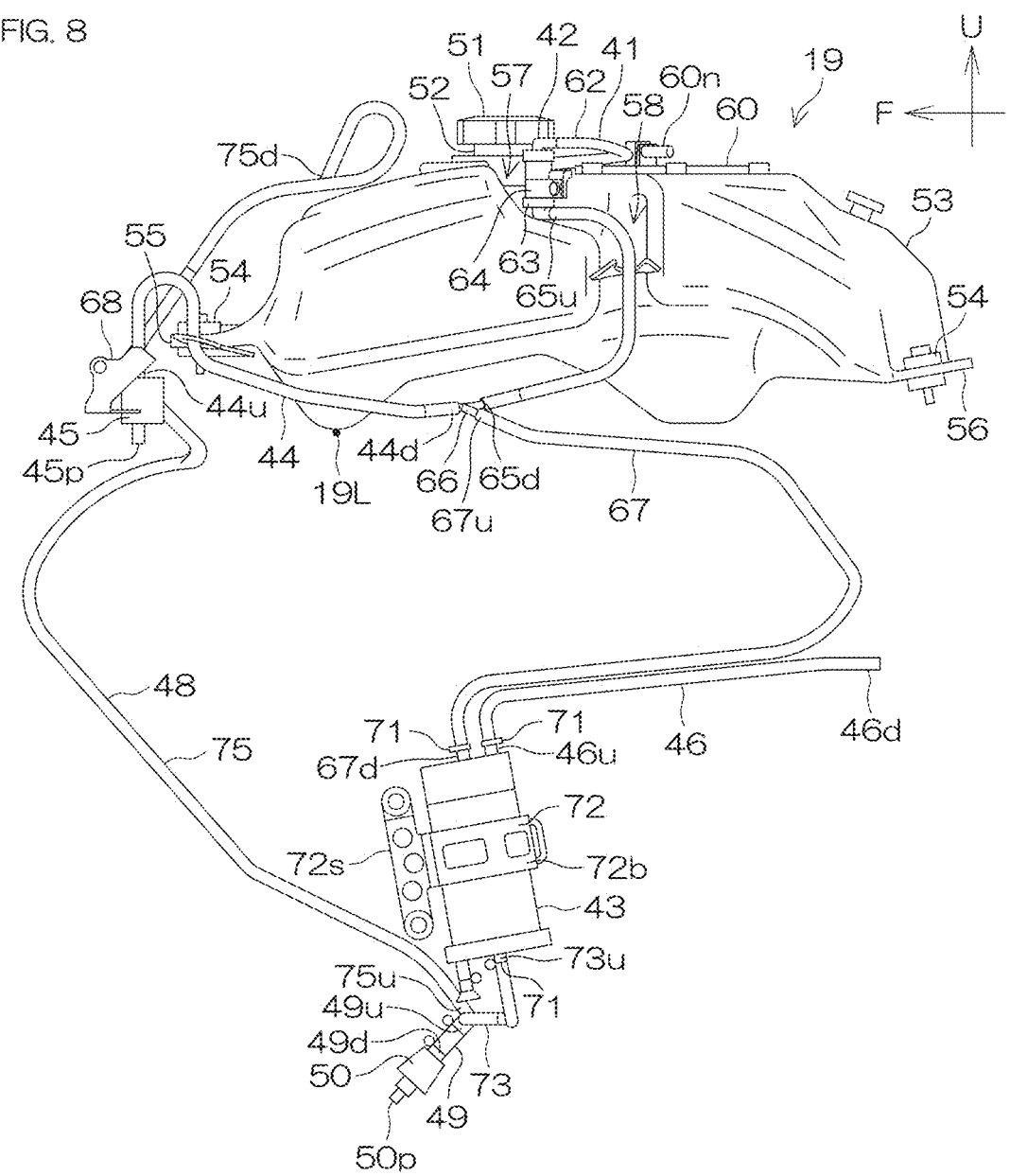
FIG. 8 is a left side view showing the fuel tank, the canister, etc.
Figure 9:
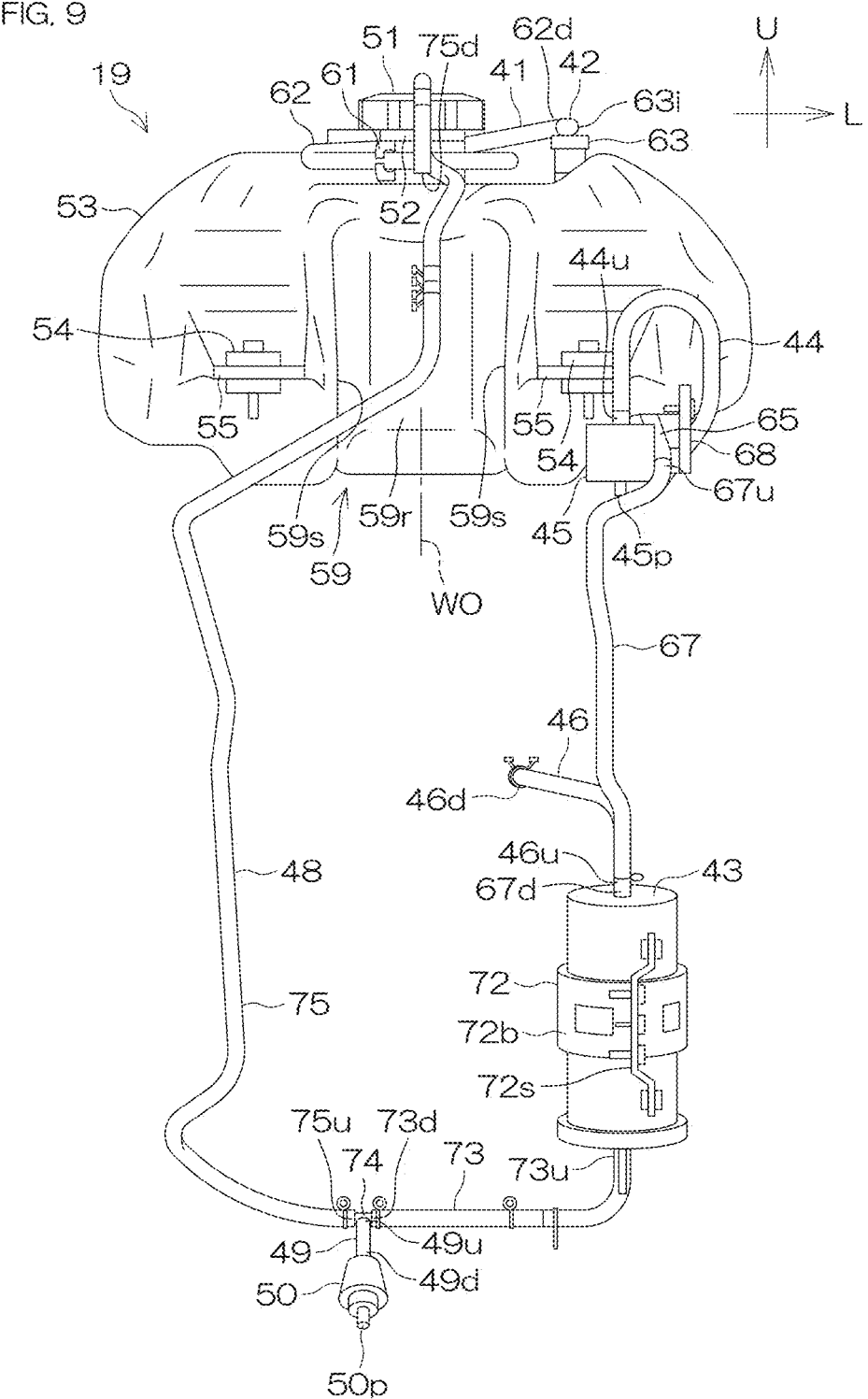
FIG. 9 is a front view showing the fuel tank, the canister, etc.
Figure 10:
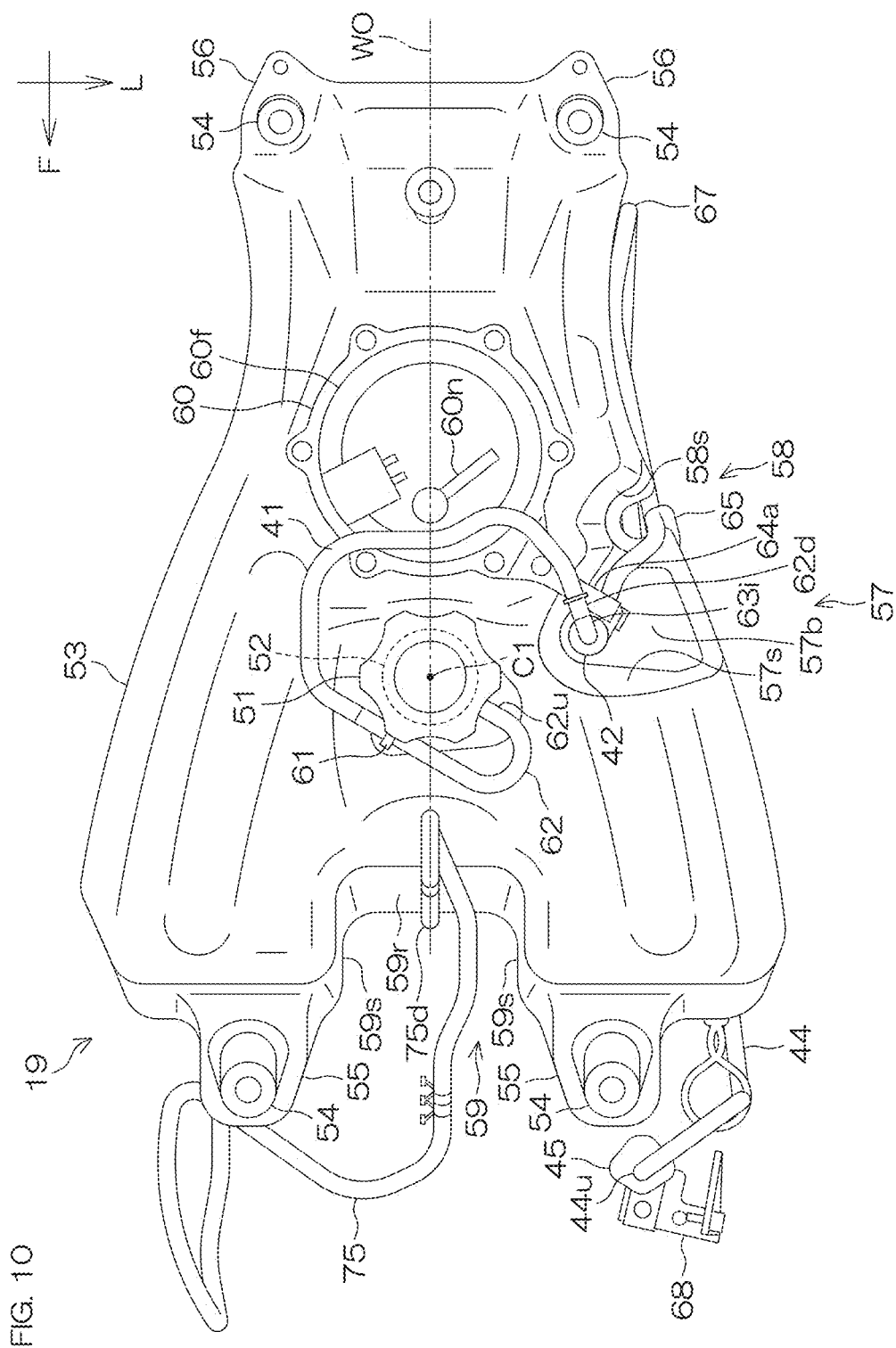
FIG. 10 is a plan view showing the fuel tank, etc.
Figure 11:
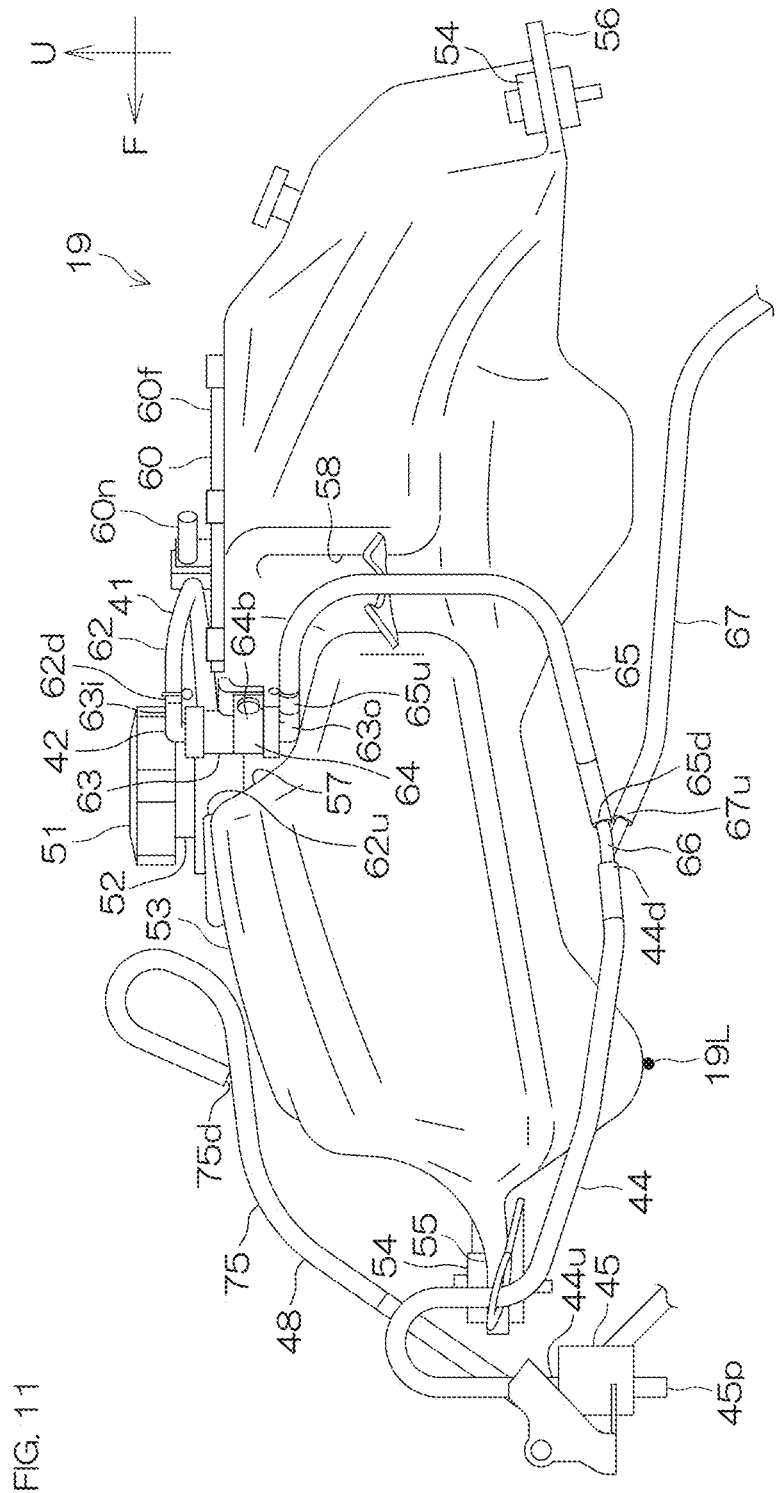
FIG. 11 is a partially enlarged view of FIG. 8.

FIG. 6 is a left side view showing the frame 2, the fuel tank 19, the engine 20, etc. FIG. 7 is a perspective plan view seen obliquely from the front showing the fuel tank 19, the canister 43, etc. FIG. 8 is a left side view showing the fuel tank 19, the canister 43, etc. FIG. 9 is a front view showing the fuel tank 19, the canister 43, etc. FIG. 10 is a plan view showing the fuel tank 19, etc. FIG. 11 is a partially enlarged view of FIG. 8, showing the left side surface of the fuel tank 19, etc.

As shown in FIG. 7, the fuel tank 19 includes a hollow tank body 53 to contain liquid fuel, a tank pipe 52 defining a fuel inlet through which liquid fuel to be supplied into the tank body 53 passes, and the tank cap 51 arranged to open/close the fuel inlet. FIG. 7 shows an example in which the fuel tank 19 includes a fuel pump 60. When the fuel supplier 37 (see FIG. 4) is a carburetor, the fuel pump 60 may be omitted.

The tank pipe 52 protrudes upward from the tank body 53. An upper end portion of the tank pipe 52 defines the fuel inlet. The tank cap 51 is disposed above the tank pipe 52. The tank cap 51 is attached to an upper end portion of the tank pipe 52. As shown in FIG. 10, the tank cap 51 is disposed in front of the fuel pump 60 in a plan view. The fuel pump 60 and the tank cap 51 overlap the vehicle center WO in a plan view.

As shown in FIG. 10, the fuel pump 60 includes a nozzle 60n arranged to eject liquid fuel in the fuel tank 19 therethrough and a flange 60f fixed to the tank body 53 using bolts, for example. An upper end portion of the fuel pump 60 including the nozzle 60n and the flange 60f is disposed on the upper surface of the tank body 53 and exposed at the upper surface of the tank body 53. The entire fuel pump 60 excluding the upper end portion is disposed inside of the tank body 53.

The fuel tank 19 further includes a plurality of mount flanges 55 to 56 attached to the frame 2 via a plurality of mount rubbers 54. FIG. 10 shows an example in which four mount flanges 55 to 56 are provided on the fuel tank 19 and a mount rubber 54 is provided for each of the mount flanges 55 to 56. The mount flanges 55 to 56 may be integral with the tank body 53 or may be members separate from and fixed to the tank body 53.

The four mount flanges 55 to 56 include two front flanges 55 protruding forward from the tank body 53 and two rear flanges 56 protruding rearward from the tank body 53. The two front flanges 55 are disposed, respectively, to the right and left of the vehicle center WO. The two rear flanges 56 are disposed, respectively, to the right and left of the vehicle center WO. The two front flanges 55 are disposed farther to the front than the tank cap 51 in a plan view. The two rear flanges 56 are disposed farther to the rear than the fuel pump 60 in a plan view.

The tank body 53 may include at least one recessed portion recessed from the outer surface of the tank body 53. FIG. 10 shows an example in which three recessed portions are provided in the tank body 53. As shown in FIG. 10, the tank body 53 includes an upper recessed portion 57 recessed downward from the upper surface of the tank body 53 that corresponds to the upper surface of the fuel tank 19 and a side recessed portion 58 recessed inward in the vehicle width direction from the side surface of the tank body 53 that corresponds to the side surface of the fuel tank 19. The tank body 53 further includes a front recessed portion 59 recessed rearward from the front surface of the tank body 53 that corresponds to the front surface of the fuel tank 19.

The upper recessed portion 57 of the tank body 53 includes a bottom surface 57b disposed lower than the upper surface of the tank body 53 and a side surface 57s extending downward from the upper surface of the tank body 53 to the bottom surface 57b. The side recessed portion 58 of the tank body 53 includes a side surface 58s extending downward from the upper surface of the tank body 53 and extending inward in the vehicle width direction from the side surface of the tank body 53. The side recessed portion 58 is recessed inward in the vehicle width direction from the side surface of the tank body 53 and vertically penetrates the tank body 53.

The front recessed portion 59 of the tank body 53 is recessed rearward from the front surface of the tank body 53 and vertically penetrates the tank body 53. The front recessed portion 59 includes a rear surface 59r disposed farther to the rear than the front surface of the tank body 53 and a pair of side surfaces 59s extending forward from a right end portion and a left end portion of the rear surface 59r. The rear surface 59r of the front recessed portion 59 overlaps the vehicle center WO. The pair of side surfaces 59s of the front recessed portion 59 are disposed to the right and left of the vehicle center WO. In the vehicle width direction, the front flanges 55 are disposed farther outward than the front recessed portion 59.

As shown in FIG. 6, at least a portion of the shaft holder 12 on which the steering shaft 11 is supported is disposed in the front recessed portion 59 of the tank body 53. FIG. 6 shows an example in which a front end portion of the shaft holder 12 is disposed in front of the tank body 53 in a side view and the remaining portion of the shaft holder 12 is disposed in the front recessed portion 59. In the example shown in FIG. 6, a portion of the steering shaft 11 is also disposed in the front recessed portion 59. The shaft holder 12 is disposed higher than a lower end 19L of the fuel tank 19. The shaft holder 12 is disposed higher than the front flanges 55 of the fuel tank 19. The shaft holder 12 is disposed lower than the tank cap 51.

As shown in FIG. 10, the charge hose 41 includes a first charge hose 62 extending from the fuel tank 19 to the rollover valve 42 and a second charge hose 65 extending from the rollover valve 42 toward the canister 43. FIG. 10 shows an example in which the first charge hose 62 extends from the tank pipe 52 to the rollover valve 42 in a manner surrounding the tank pipe 52 in a plan view. The first charge hose 62 may extend along the shortest path from the tank pipe 52 to the rollover valve 42 in a plan view.

An upstream end 62u of the first charge hose 62 corresponds to the upstream end of the charge hose 41. The upstream end 62u of the first charge hose 62 is connected to the tank pipe 52. A downstream end 62d of the first charge hose 62 is connected to the rollover valve 42. As shown in FIG. 11, an upstream end 65u of the second charge hose 65 is also connected to the rollover valve 42. The rollover valve 42 is disposed above the fuel tank 19 and, in a plan view, overlaps the fuel tank 19. Accordingly, the downstream end 62d of the first charge hose 62 and the upstream end 65u of the second charge hose 65 are also disposed above the fuel tank 19 and, in a plan view, overlap the fuel tank 19.

As shown in FIG. 10, the first charge hose 62 surrounds the tank pipe 52 by about 180 degrees or more, for example, around a center Cl of the tank pipe 52 in a plan view. FIG. 10 shows an example in which the first charge hose 62 surrounds the tank pipe 52 by about 270 degrees or more, for example. The first charge hose 62 passes through a position opposite to the rollover valve 42 with respect to the tank pipe 52. The shortest distance from the upstream end 62u of the first charge hose 62 to the rollover valve 42 in a plan view is shorter than the shortest distance from the center Cl of the tank pipe 52 to the rollover valve 42 in a plan view.

As shown in FIG. 10, the fuel tank 19 may include a hose holder 61 that holds the first charge hose 62. The hose holder 61 protrudes from the outer peripheral surface of the tank pipe 52. The first charge hose 62 passes through the space on the inside of the hose holder 61. The hose holder 61 may have a continuous cylindrical shape across the entire circumference or may have a C shape. The hose holder 61 is disposed farther to the front than the upstream end 62u of the first charge hose 62. The hose holder 61 is disposed opposite to the upstream end 62u of the first charge hose 62 with respect to the vehicle center WO. The upstream end 62u of the first charge hose 62 is disposed closer to the rollover valve 42 than to the hose holder 61 in a plan view.

The upstream end 62u of the first charge hose 62 is disposed above the fuel tank 19 and, in a plan view, overlaps the fuel tank 19. The upstream end 62u of the first charge hose 62 is disposed farther to the front than the downstream end 62d of the first charge hose 62. The upstream end 62u of the first charge hose 62 is disposed farther to the front than any portion of the rollover valve 42. In the vehicle width direction, the upstream end 62u of the first charge hose 62 is disposed farther inward than the downstream end 62d of the first charge hose 62. The upstream end 62u of the first charge hose 62 is disposed on the same side as the downstream end 62d of the first charge hose 62 with respect to the vehicle center WO.

As shown in FIG. 11, the downstream end 62d of the first charge hose 62 is disposed higher than the upstream end 62u of the first charge hose 62. The upper end of the rollover valve 42 is disposed higher than the upstream end 62u of the first charge hose 62. The downstream end 62d of the first charge hose 62 is the highest portion of the first charge hose 62. Every portion of the first charge hose 62 extends horizontally or upward toward the downstream end 62d of the first charge hose 62.

As shown in FIG. 10, the rollover valve 42 is disposed above the tank body 53 and, in a plan view, overlaps the tank body 53. The rollover valve 42 is disposed farther to the rear than the center Cl of the tank pipe 52 in a plan view. In the vehicle width direction, the rollover valve 42 is disposed farther outward than the center Cl of the tank pipe 52 in a plan view. The rollover valve 42 is disposed farther to the front than the nozzle 60n of the fuel pump 60 in a plan view.

As shown in FIG. 11, an upper end portion of the rollover valve 42 is disposed higher than the upper surface of the tank body 53. The upper end portion of the rollover valve 42 overlaps the tank pipe 52 and the tank cap 51 in a side view. A lower end portion of the rollover valve 42 is disposed lower than the upper surface of the tank body 53. The lower end portion of the rollover valve 42 overlaps the tank body 53 in a side view.

The lower end portion of the rollover valve 42 is disposed in the upper recessed portion 57 of the tank body 53. The lower end portion of the rollover valve 42 overlaps the side surface 57s of the upper recessed portion 57 (see FIG. 10) in a side view. The upstream end 65u of the second charge hose 65 is also disposed in the upper recessed portion 57 of the tank body 53. The second charge hose 65 passes through the side recessed portion 58 of the tank body 53 to extend downward from the rollover valve 42 toward the canister 43. As shown in FIG. 10, the rollover valve 42 is disposed above the bottom surface 57b of the upper recessed portion 57 and, in a plan view, overlaps the bottom surface 57b.

As shown in FIG. 11, the rollover valve 42 includes a valve body 63 defining an annular valve seat through which the fuel evaporative emission passes and a valve member arranged to close the valve seat only when the inclination angle of the vehicle 1 exceeds the upper limit value. The rollover valve 42 further includes an inflow port 63i through which the fuel evaporative emission that passes through the valve body 63 flows in and an outflow port 63o through which the fuel evaporative emission that has passed through the valve body 63 is discharged.

The downstream end 62d of the first charge hose 62 is connected to the inflow port 63i of the rollover valve 42. The upstream end 65u of the second charge hose 65 is connected to the outflow port 63o of the rollover valve 42. The inflow port 63i is disposed higher than the outflow port 63o. Accordingly, the downstream end 62d of the first charge hose 62 is disposed higher than the upstream end 65u of the second charge hose 65.

The rollover valve 42 is held on a valve holder 64. FIG. 11 shows an example in which the valve holder 64 is provided on the fuel pump 60. The valve holder 64 may be provided on a member other than the fuel pump 60, such as the tank body 53. The valve holder 64 includes a holder arm 64a (see FIG. 10) protruding outward from the annular flange 60f of the fuel tank 19 and a holder band 64b (see FIG. 11) wound around the rollover valve 42. Both ends of the holder band 64b are fixed to the holder arm 64a using bolts, for example. As a result, the rollover valve 42 is held on the fuel pump 60 via the valve holder 64.

As shown in FIG. 8, the second charge hose 65 extends rearward from the rollover valve 42. The upstream end 65u of the second charge hose 65 is disposed higher than a downstream end 65d of the second charge hose 65. The upstream end 65u of the second charge hose 65 is disposed farther to the rear than the downstream end 65d of the second charge hose 65. The downstream end 65d of the second charge hose 65 is disposed below the fuel tank 19 and, in a plan view, overlaps the fuel tank 19.

In addition to the first charge hose 62 and the second charge hose 65, the charge hose 41 includes a three-way pipe 66 attached to the downstream end 65d of the second charge hose 65 and a third charge hose 67 extending from the three-way pipe 66 to the canister 43. The three-way pipe 66 is, for example, a three-directional pipe joint. An upstream end 67u of the third charge hose 67 is attached to the three-way pipe 66. A downstream end 44d of the relief hose 44 is also attached to the three-way pipe 66. The passage in the second charge hose 65 is connected through the passage in the three-way pipe 66 to the passage in the third charge hose 67 and the passage in the relief hose 44.

A downstream end 67d of the third charge hose 67 is attached to the canister 43. The downstream end 67d of the third charge hose 67 corresponds to the downstream end of the charge hose 41. The third charge hose 67 extends rearward from the three-way pipe 66 and then extends forward toward the canister 43. Accordingly, the charge hose 41 does not follow the shortest path from the rollover valve 42 to the canister 43, but bypasses the path to extend from the rollover valve 42 to the canister 43.

The upstream end 67u of the third charge hose 67 is disposed higher than the downstream end 67d of the third charge hose 67. The upstream end 67u of the third charge hose 67 is disposed farther to the rear than the downstream end 67d of the third charge hose 67. The upstream end 67u of the third charge hose 67 and the downstream end 67d of the third charge hose 67 are disposed below the fuel tank 19 and, in a plan view, overlap the fuel tank 19. The upstream end 67u of the third charge hose 67 is disposed farther outward than the downstream end 67d of the third charge hose 67 in the vehicle width direction.

As shown in FIG. 8, the downstream end 44d of the relief hose 44 is attached to the three-way pipe 66. The relief valve 45 is attached to the upstream end 44u of the relief hose 44. The upstream end 44u of the relief hose 44 is disposed farther to the front than the downstream end 44d of the relief hose 44. The upstream end 44u of the relief hose 44 is disposed higher than the downstream end 44d of the relief hose 44. The upstream end 44u of the relief hose 44 faces downward. The upstream end 44u of the relief hose 44 may face directly downward or may face obliquely downward.

As shown in FIG. 10, the upstream end 44u of the relief hose 44 is disposed above the relief valve 45 and, in a plan view, overlaps the relief valve 45. The upstream end 44u of the relief hose 44 is disposed farther to the front than the tank body 53 and, in a plan view, does not overlap the tank body 53. On the other hand, the downstream end 44d of the relief hose 44 is disposed below the fuel tank 19 and, in a plan view, overlaps the fuel tank 19. In the vehicle width direction, the downstream end 44d of the relief hose 44 is disposed farther outward than the upstream end 44u of the relief hose 44.

The relief valve 45 is attached to the frame 2 via a valve stay 68. The relief valve 45 is disposed farther to the front than the front end of the fuel tank 19 (the front ends of the front flanges 55). In the vehicle width direction, the relief valve 45 is disposed farther outward than the tank cap 51. As shown in FIG. 8, the relief valve 45 is disposed lower than the tank cap 51. The relief valve 45 is disposed higher than the canister 43. The relief valve 45 is disposed higher than the lower end 6L of the seat 6 (see FIG. 6) in a side view.

The relief valve 45 includes a fluid port 45p through which fluid flows in/out. The fluid port 45p of the relief valve 45 faces downward. Even if liquid enters the fluid port 45p of the relief valve 45, the liquid does not flow toward the relief hose 44, but drops from the fluid port 45p of the relief valve 45. Thus, it is possible to reduce the amount of liquid which enters the relief hose 44 via the relief valve 45.

The downstream end 67d of the third charge hose 67 is disposed above the canister 43 and, in a plan view, overlaps the canister 43. The upstream end 46u of the purge hose 46 is also disposed above the canister 43 and, in a plan view, overlaps the canister 43. The upstream end 46u of the purge hose 46 is attached to the canister 43. The third charge hose 67 and the purge hose 46 extend upward from the upper surface of the canister 43 and then extend rearward to a position farther to the rear than the canister 43. The downstream end 46d of the purge hose 46 is disposed at a position higher than and farther to the rear than the canister 43.

The upstream end 46u and the downstream end 46d of the purge hose 46 are disposed lower than the upstream end 67u of the third charge hose 67. The upstream end 46u and the downstream end 46d of the purge hose 46 are disposed lower than the lower end 19L of the fuel tank 19. The upstream end 46u of the purge hose 46 is disposed farther to the front than the downstream end 46d of the purge hose 46. The upstream end 46u of the purge hose 46 is disposed lower than the downstream end 46d of the purge hose 46. The upstream end 46u and the downstream end 46d of the purge hose 46 are disposed below the fuel tank 19 and, in a plan view, overlap the fuel tank 19. In the vehicle width direction, the upstream end 46u of the purge hose 46 is disposed farther inward than the downstream end 46d of the purge hose 46.

As shown in FIG. 7, the canister 43 is cylindrical. FIG. 7 shows an example in which the outer peripheral surface of the canister 43 has a circular shape. The outer peripheral surface of the canister 43 may have a shape other than a circle, such as a polygon. The charge hose 41 is attached to a pipe that protrudes upward from the upper surface of the canister 43. The purge hose 46 is attached to another pipe that protrudes upward from the upper surface of the canister 43. The vent hose 48 is attached to a pipe that protrudes upward from the lower surface of the canister 43. As shown in FIG. 8, the charge hose 41, the purge hose 46, and the vent hose 48 are fixed to their respective pipes using clips 71.

The canister 43 is disposed lower than the lower end 19L of the fuel tank 19. The canister 43 may or may not overlap the fuel tank 19 in a plan view. As shown in FIG. 6, a portion of the canister 43 overlaps the engine 20 in a side view, and the remaining portion of the canister 43 is disposed in front of the engine 20 in a side view. FIG. 6 shows an example in which the canister 43 overlaps the crank case 26 in a side view. A portion of the canister 43 is disposed in front of the engine 20 and, in a front view, overlaps the engine 20.

The canister 43 is held on a canister holder 72. The canister 43 is supported by the frame 2 via the canister holder 72. The canister holder 72 includes a band 72b disposed around the canister 43 and a stay 72s to which the both ends of the band 72b are fixed. The stay 72s is disposed in front of the canister 43 in a side view. The stay 72s is attached to the frame 2.

The rear end of the canister 43 is disposed farther to the front than the crank axis Ac in a side view. The upper end of the canister 43 is disposed higher than the crank axis Ac in a side view. The lower end of the canister 43 is disposed lower than the crank axis Ac in a side view. The rear end of the canister 43 may be disposed farther to the rear than the crank axis Ac in a side view. In this case, the front end of the canister 43 may be disposed farther to the front than or may be disposed farther to the rear than the crank axis Ac in a side view. The lower end of the canister 43 may be disposed higher than the crank axis Ac.

The center line of the canister 43 is inclined in a side view such that the upper end of the center line of the canister 43 is positioned farther to the front than the lower end of the center line of the canister 43. The center line of the canister 43 may be vertical in a side view or may be inclined in a side view such that the lower end of the center line of the canister 43 is positioned farther to the front than the upper end of the center line of the canister 43.

As shown in FIG. 9, the center line of the canister 43 is vertical in a front view. The center line of the canister 43 may be inclined in a front view or may be horizontal in a front view. The canister 43 is disposed at a position that does not overlap the vehicle center WO. In the vehicle width direction, the canister 43 is disposed farther outward than the tank cap 51. The canister 43 is disposed lower than the relief valve 45.

The vent hose 48 includes a first vent hose 73 attached to the canister 43, a three-way pipe 74 attached to the first vent hose 73, and a second vent hose 75 attached to the first vent hose 73 via the three-way pipe 74. The drain hose 49 is attached to the three-way pipe 74 and branched from the vent hose 48. The passage in the first vent hose 73 is connected through the passage in the three-way pipe 74 to the passage in the second vent hose 75 and the passage in the drain hose 49.

The first vent hose 73 extends downward from the canister 43 and then extends inward in the vehicle width direction. An upstream end 73u of the first vent hose 73 is attached to the canister 43. A downstream end 73d of the first vent hose 73 is attached to the three-way pipe 74. The upstream end 73u of the first vent hose 73 corresponds to the upstream end of the vent hose 48.

The upstream end 73u of the first vent hose 73 is disposed higher than the downstream end 73d of the first vent hose 73. In the vehicle width direction, the upstream end 73u of the first vent hose 73 is disposed farther outward than the downstream end 73d of the first vent hose 73. The downstream end 73d of the first vent hose 73 is disposed lower than the canister 43. Every portion of the first vent hose 73 is disposed below the fuel tank 19 and, in a plan view, overlaps the fuel tank 19.

The drain hose 49 extends downward from the three-way pipe 74. An upstream end 49u of the drain hose 49 is attached to the three-way pipe 74. A downstream end 49d of the drain hose 49 is attached to the drain valve 50. The drain valve 50 is attached to the frame 2 via a bracket. The upstream end 49u of the drain hose 49 is disposed higher than the downstream end 49d of the drain hose 49. The upstream end 49u of the drain hose 49 is disposed lower than the canister 43. Accordingly, the downstream end 49d of the drain hose 49 and the drain valve 50 are disposed lower than the canister 43.

The drain hose 49 may be vertical in a front view or may be inclined in a front view. Similarly, the drain hose 49 may be vertical in a side view or may be inclined in a side view. FIGS. 8 and 9 show an example in which the drain hole 49 is inclined in a side view but vertical in a front view. In the example shown in FIG. 8, the downstream end 49d of the drain hose 49 is disposed farther to the front than the upstream end 49u of the drain hose 49. The downstream end 49d of the drain hose 49 may be disposed farther to the rear than the upstream end 49u of the drain hose 49.

The downstream end 49d of the drain hose 49 and the drain valve 50 are disposed below the fuel tank 19 and, in a plan view, overlap the fuel tank 19. The downstream end 49d of the drain hose 49 and the drain valve 50 are disposed lower than the lower end of the canister 43. As shown in FIG. 9, the downstream end 49d of the drain hose 49 and the drain valve 50 are disposed farther to the front than the rear end of the canister 43. The downstream end 49d of the drain hose 49 and the drain valve 50 are disposed at positions lower than the crank axis Ac (see FIG. 6) and farther to the front than the crank axis Ac. The downstream end 49d of the drain hose 49 and the drain valve 50 are disposed lower than the pivot axis Ap (see FIG. 6).

As shown in FIG. 9, in the vehicle width direction, the downstream end 49d of the drain hose 49 and the drain valve 50 are disposed farther inward than the canister 43. The downstream end 49d of the drain hose 49 and the drain valve 50 may be disposed opposite to the canister 43 with respect to the vehicle center WO or may be disposed on the same side as the canister 43 with respect to the vehicle center WO. FIG. 9 shows an example in which the downstream end 49d of the drain hose 49 and the drain valve 50 are disposed to the right of the vehicle center WO, while the canister 43 is disposed to the left of the vehicle center WO.

The drain valve 50 includes a fluid port 50p through which fluid flows in/out. The fluid port 50p of the drain valve 50 faces downward. The fluid port 50p of the drain valve 50 may be vertical in a front view or may be inclined in a front view. The fluid port 50p of the drain valve 50 may be vertical in a side view or may be inclined in a side view. FIGS. 8 and 9 show an example in which the fluid port 50p of the drain valve 50 is inclined in a side view but vertical in a front view. In the example shown in FIG. 8, the fluid port 50p of the drain valve 50 is disposed farther to the front than the drain hose 49.

As shown in FIG. 9, the second vent hose 75 extends from the three-way pipe 74 outward in the vehicle width direction and then extends upward. An upstream end 75u of the second vent hose 75 is attached to the three-way pipe 74. A downstream end 75d of the second vent hose 75 is attached to the steering shaft 11 (see FIG. 6). The downstream end 75d of the second vent hose 75 corresponds to the downstream end of the vent hose 48.

The upstream end 75u of the second vent hose 75 is disposed lower than the downstream end 75d of the second vent hose 75. In the vehicle width direction, the upstream end 75u of the second vent hose 75 is disposed farther outward than the downstream end 75d of the second vent hose 75. FIG. 9 shows an example in which the downstream end 75d of the second vent hose 75 overlaps the vehicle center WO in a front view. The downstream end 75d of the second vent hose 75 overlaps the fuel tank 19 in a front view.

As shown in FIG. 10, the downstream end 75d of the second vent hose 75 is disposed in the front recessed portion 59 of the tank body 53 in a plan view. The downstream end 75d of the second vent hose 75 is disposed between the pair of side surfaces 59s in the vehicle width direction in a plan view. The downstream end 75d of the second vent hose 75 is disposed in front of the tank cap 51 in a plan view. The downstream end 75d of the second vent hose 75 is disposed farther to the rear than the front flanges 55.

As shown in FIG. 8, the downstream end 75d of the second vent hose 75 is disposed farther to the front than the upstream end 75u of the second vent hose 75. A tip portion of the second vent hose 75 including the downstream end 75d of the second vent hose 75 is disposed above the fuel tank 19 in a side view. The downstream end 75d of the second vent hose 75 is disposed higher than the front flanges 55. The downstream end 75d of the second vent hose 75 is disposed farther to the rear than the relief valve 45. The downstream end 75d of the second vent hose 75 is disposed farther to the front than the drain valve 50. The downstream end 75d of the second vent hose 75 is disposed farther to the front than the front end of the canister 43.

The upstream end 75u of the second vent hose 75 is disposed at a position farther to the rear than the steering shaft 11 and lower than the shaft holder 12. As shown in FIG. 6, the second vent hose 75 extends upward from a position farther to the rear than the steering shaft 11 to a position farther to the front than the steering shaft 11. The second vent hose 75 then extends upward along the outer peripheral surface of the steering shaft 11. A tip portion of the second vent hose 75 including the downstream end 75d of the second vent hose 75 is disposed higher than the shaft holder 12.

As shown in FIG. 9, the vent hose 48, which includes the first vent hose 73, the three-way pipe 74, and the second vent hose 75, extends downward from the canister 43 and then extends upward to a position higher than the canister 43. Accordingly, a lower portion of the vent hose 48 is disposed in a U shape. When water enters the downstream end of the vent hose (the downstream end 75d of the second vent hose 75), the water pools in the lower portion of the vent hose 48. The drain hose 49 is connected to the lower portion of the vent hose 48. Therefore, even if water enters the downstream end of the vent hose 48, it is possible to discharge the water into the drain hose 49.

Figure 12:
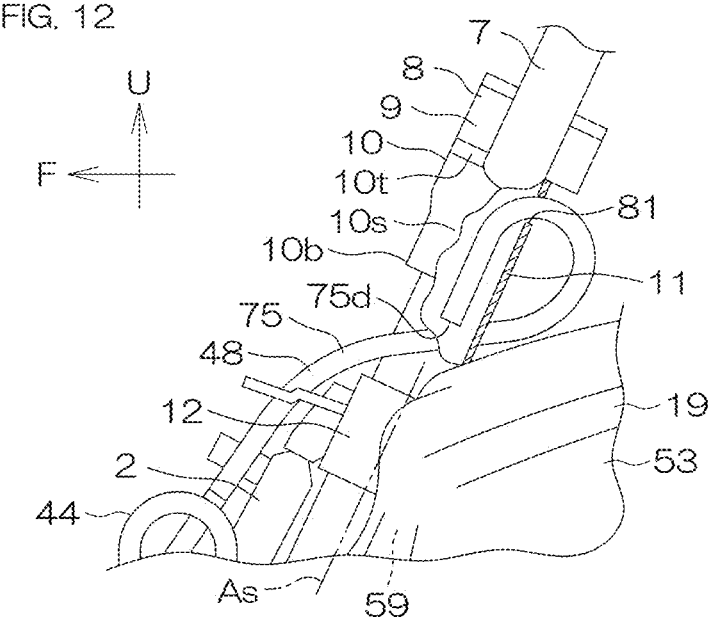
FIG. 12 is a left side view showing that a downstream end of a second vent hose corresponding to a downstream end of a vent hose is disposed inside of a steering shaft.
Figure 13:
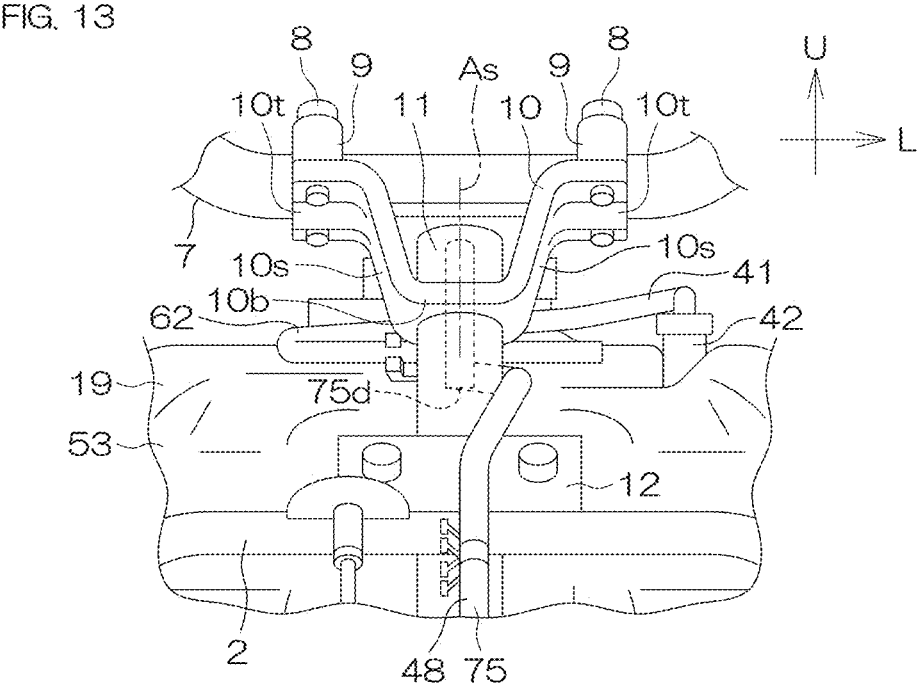
FIG. 13 is a front view showing that the downstream end of the second vent hose is disposed inside of the steering shaft.

FIG. 12 is a left side view showing that the downstream end 75d of the second vent hose 75 corresponding to the downstream end of the vent hose 48 is disposed inside of the steering shaft 11. FIG. 13 is a front view showing that the downstream end 75d of the second vent hose 75 is disposed inside of the steering shaft 11.

The downstream end 75d of the second vent hose 75 corresponds to the downstream end of the vent hose 48. As shown in FIG. 12, a tip portion of the second vent hose 75 including the downstream end 75d of the second vent hose 75 is inserted in a through hole 81 that is open at the outer peripheral surface of the steering shaft 11. The downstream end 75d of the second vent hose 75 is disposed inside of the steering shaft 11. The downstream end 75d of the second vent hose 75 is disposed lower than the through hole 81 of the steering shaft 11. The downstream end 75d of the second vent hose 75 faces downward on the inside of the steering shaft 11.

The through hole 81 of the steering shaft 11 extends from the outer peripheral surface of the steering shaft 11 to the inner peripheral surface of the steering shaft 11. The through hole 81 is disposed higher than the lower end 19L of the fuel tank 19 (see FIG. 6). FIG. 12 shows an example in which the through hole 81 is disposed higher than the lower end of the handle bracket 8 (the lower end of the bottom plate 10b). In the example shown in FIG. 12, the through hole 81 is disposed higher than the shaft holder 12.

The through hole 81 of the steering shaft 11 may be disposed at a position visible or may be disposed at a position not visible in a front view. FIG. 13 shows an example in which the through hole 81 is disposed in a rear portion of the outer peripheral surface of the steering shaft 11 and therefore not visible in a front view. In the example shown in FIG. 13, the second vent hose 75 wraps around from a position farther to the front than the steering shaft 11 to a position farther to the rear than the steering shaft 11 and is inserted in the through hole 81 from the position farther to the rear than the steering shaft 11.

The steering handle 7 is arranged to turn about the steering axis As between a right maximum steering position and a left maximum steering position. The steering shaft 11 is arranged to turn about the steering axis As together with the steering handle 7. When the steering shaft 11 turns about the steering axis As, a portion of the second vent hose 75 disposed on the outside of the steering shaft 11 moves in the left-right direction according to the operation of the steering shaft 11. The downstream end 75d of the second vent hose 75 is disposed inside of the steering shaft 11 regardless of the position of the steering handle 7 within the range from the right maximum steering position to the left maximum steering position.

Figure 14:
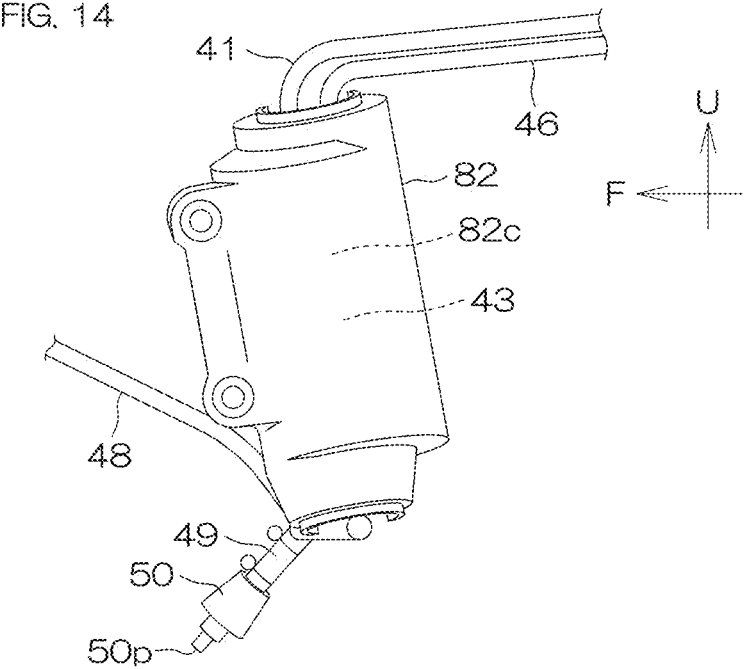
FIG. 14 is a left side view showing a canister cover.
Figure 15:
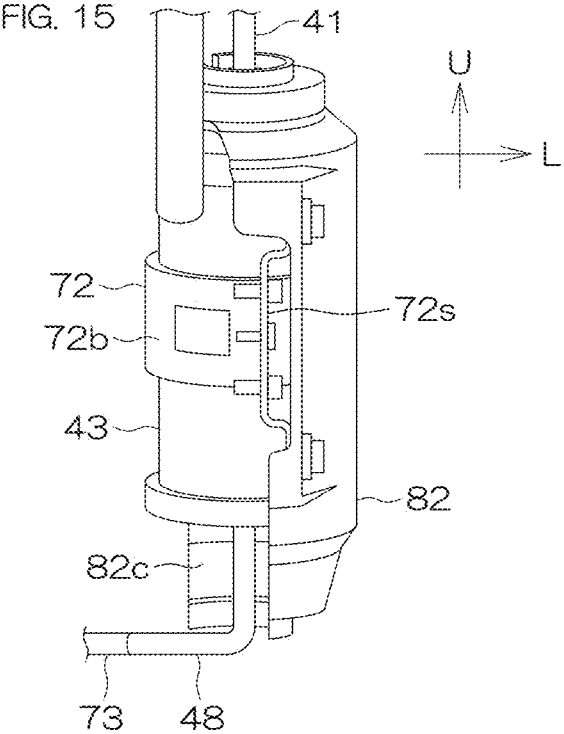
FIG. 15 is a front view showing the canister and the canister cover.

FIG. 14 is a left side view showing a canister cover 82. FIG. 15 is a front view showing the canister 43 and the canister cover 82.

As shown in FIG. 14, the vehicle 1 may include the canister cover 82 that covers at least a portion of the canister 43. As shown in FIG. 15, the canister 43 is disposed at an inner side of the canister cover 82 in the vehicle width direction. The clips 71 (see FIG. 8) that fix the charge hose 41, the purge hose 46 (see FIG. 8), and the vent hose 48 to three pipes of the canister 43 are also disposed at the inner side of the canister cover 82 in the vehicle width direction. The canister cover 82 is fixed to the canister holder 72 (see FIG. 8).

As shown in FIG. 15, the canister cover 82 defines a housing recessed portion 82c recessed outward in the vehicle width direction. The canister 43 is inserted in the housing recessed portion 82c. As shown in FIG. 14, the canister cover 82 overlaps every portion of the canister 43 in a side view. The canister 43 is disposed between the canister cover 82 and the engine 20 (see FIG. 6) in the vehicle width direction.

The canister cover 82 overlaps only a portion of the canister 43 in a front view, and the remaining portion of the canister 43 does not overlap the canister cover 82 in a front view. Similarly, in any of front, rear, plan, and bottom views of the canister 43 and the canister cover 82, the canister cover 82 overlaps only a portion of the canister 43, and the remaining portion of the canister 43 does not overlap the canister cover 82. In an interior view of the canister 43 and the canister cover 82, every portion of the canister 43 is not covered with the canister cover 82 and is visible.

In the preferred embodiments described above, the fuel tank 19 is disposed above the engine 20. The fuel evaporative emission discharged from the fuel tank 19 flows into the canister 43. The fuel evaporative emission is adsorbed by the adsorbent in the canister 43. Thus, it is possible to reduce the fuel evaporative emission released into the atmosphere.

On the other hand, air guided through the vent hose 48 flows into the canister 43. The fuel evaporative emission adsorbed by the adsorbent in the canister 43 is desorbed from the adsorbent by the supply of the air from the vent hose 48. The capacity of the canister 43, that is, the total amount of the fuel evaporative emission adsorbable by the adsorbent is recovered through desorption of the fuel evaporative emission. Therefore, long-term usage of the canister 43 is made possible by desorption of the fuel evaporative emission from the adsorbent.

The vent hose 48 is connected to the canister 43. Even if the canister 43 is disposed at a low position, the opening of the canister 43 is protected by the vent hose 48, thus, water is less likely to enter the canister 43. Therefore, it is possible to reduce the amount of water which enters the canister 43. Further, even if water enters the vent hose 48, it is possible to discharge the water into the drain hose 49.

In the preferred embodiments described above, the rollover valve 42, which is arranged to open/close in accordance with the posture of the vehicle 1, is disposed on the charge hose 41. When the inclination angle of the vehicle 1 exceeds an upper limit value, the rollover valve 42 closes, thus, fluid in the charge hose 41 is blocked by the rollover valve 42. Even if liquid fuel in the fuel tank 19 flows into the charge hose 41, the liquid fuel is blocked by the rollover valve 42. Thus, it is possible to prevent the liquid fuel from flowing through the charge hose 41 into the canister 43.

The rollover valve 42 is disposed above the fuel tank 19 and, in a plan view, overlaps the fuel tank 19. At least a portion of the rollover valve 42 is disposed in the upper recessed portion 57 of the fuel tank 19. The upper recessed portion 57 of the fuel tank 19 is recessed downward from the upper surface of the fuel tank 19. Therefore, it is possible to lower the position of the upper end of the rollover valve 42 in comparison to a case in which an upper recessed portion 57 is not provided. Thus, it is possible to dispose the rollover valve 42 while minimizing the influence on other components.

In the preferred embodiments described above, the upper recessed portion 57 of the fuel tank 19 is recessed downward from the upper surface of the fuel tank 19 as well as recessed inward in the width direction of the vehicle 1 from the side surface of the fuel tank 19. The charge hose 41, which is arranged to guide the fuel evaporative emission discharged from the fuel tank 19 to the canister 43, is partially disposed in the upper recessed portion 57. In other words, the space in the upper recessed portion 57 is utilized as a space to dispose a portion of the charge hose 41. Thus, it is possible to dispose the charge hose 41 while minimizing the influence on other components.

In the preferred embodiments described above, the inflow port 63*i* of the rollover valve 42 is disposed higher than the outflow port 63*o* of the rollover valve 42. The inflow port 63*i* of the rollover valve 42 is thus disposed at a higher position, compared to a case in which the inflow port 63*i* of the rollover valve 42 is disposed lower than the outflow port 63*o* of the rollover valve 42. Accordingly, the charge hose 41 is easily laid out such that each portion of the charge hose 41 extends horizontally or upward toward the inflow port 63*i* of the rollover valve 42, and thus liquid fuel flowing in the charge hose 41 is less likely to reach the inflow port 63*i* of the rollover valve 42.

In the preferred embodiments described above, the first charge hose 62, which is arranged to guide the fuel evaporative emission therethrough, extends from the fuel tank 19 to the rollover valve 42. Since the downstream end 62*d* of the first charge hose 62 is disposed higher than the upstream end 62*u* of the first charge hose 62, the first charge hose 62 is easily laid out such that each portion of the first charge hose 62 extends horizontally or upward toward the downstream end 62*d* of the first charge hose 62. Accordingly, even if liquid fuel flows into the first charge hose 62, the liquid fuel is less likely to reach the rollover valve 42.

In the preferred embodiments described above, the downstream end 75*d* of the second vent hose 75 corresponds to the downstream end of the vent hose 48. The downstream end 75*d* of the second vent hose 75 is disposed inside of the cylindrical steering shaft 11 that rotates together with the steering handle 7. The downstream end 75*d* of the second vent hose 75 is protected by the steering shaft 11 that surrounds the downstream end 75*d* of the second vent hose 75. Small fragments such as pebbles and/or liquid such as rainwater are less likely to enter the vent hose 48 through the downstream end 75*d* of the second vent hose 75. Thus, it is possible to reduce the amount of liquid and/or solid which enters the vent hose 48 through the downstream end 75*d* of the second vent hose 75.

In the preferred embodiments described above, the downstream end 75*d* of the second vent hose 75 is not only disposed inside of the steering shaft 11, but also faces downward on the inside of the steering shaft 11. Since the downstream end 75*d* of the second vent hose 75 faces downward, even if liquid and/or solid enters the steering shaft 11, the liquid and/or solid is less likely to enter the vent hose 48. Thus, it is possible to reduce the amount of liquid and/or solid which enters the vent hose 48 through the downstream end 75*d* of the second vent hose 75.

In this preferred embodiment, the vent hose 48 is inserted in the through hole 81 that is open at the outer peripheral surface of the steering shaft 11. The downstream end 75*d* of the second vent hose 75 is disposed lower than the through hole 81 of the steering shaft 11. Accordingly, the downstream end 75*d* of the second vent hose 75 faces downward on the inside of the steering shaft 11. Thus, it is possible to reduce the amount of liquid and/or solid which enters the vent hose 48 through the downstream end 75*d* of the second vent hose 75.

Other Preferred Embodiments

The present invention is not restricted to the contents of the preferred embodiments described above, and various modifications are possible.

For example, the vehicle 1 may include three wheels or may include five or more wheels. The vehicle 1, when it includes three wheels, may include two front wheels Wf and one rear wheel Wr or may include one front wheel Wf and two rear wheels Wr.

The vehicle 1 may include a seat 6 with a seat back instead of a saddle-type seat 6 that a rider straddles. In this case, the vehicle 1 may further include a side seat disposed at a side of the seat 6 or may further include a rear seat disposed farther to the rear than the seat 6. The vehicle 1 may include both a side seat and a rear seat.

The downstream end 49*d* of the drain hose 49 may be disposed at the same height as the crank axis Ac or may be disposed higher than the crank axis Ac.

The downstream end 49*d* of the drain hose 49 may be disposed at the same height as the pivot axis Ap or may be disposed higher than the pivot axis Ap.

The drain valve 50 may be omitted from the vehicle 1.

The entire rollover valve 42 may be disposed inside of the upper recessed portion 57 of the fuel tank 19. Alternatively, the entire rollover valve 42 may be disposed on the outside of the upper recessed portion 57 of the fuel tank 19.

The inflow port 63*i* of the rollover valve 42 may be disposed at the same height as the outflow port 63*o* of the rollover valve 42 or may be disposed lower than the outflow port 63o of the rollover valve 42.

The downstream end 62d of the first charge hose 62 may be disposed at the same height as the upstream end 62u of the first charge hose 62 or may be disposed lower than the upstream end 62u of the first charge hose 62.

The downstream end 75d of the second vent hose 75 may be disposed on the outside of the steering shaft 11. In this case, the downstream end 75d of the second vent hose 75 is preferably covered with an exterior cover.

The downstream end 75d of the second vent hose 75 may face upward on the inside of the steering shaft 11.

The downstream end 75d of the second vent hose 75 may be disposed at the same height as the through hole 81 of the steering shaft 11 or may be disposed higher than the through hole 81 of the steering shaft 11.

Figure 16:
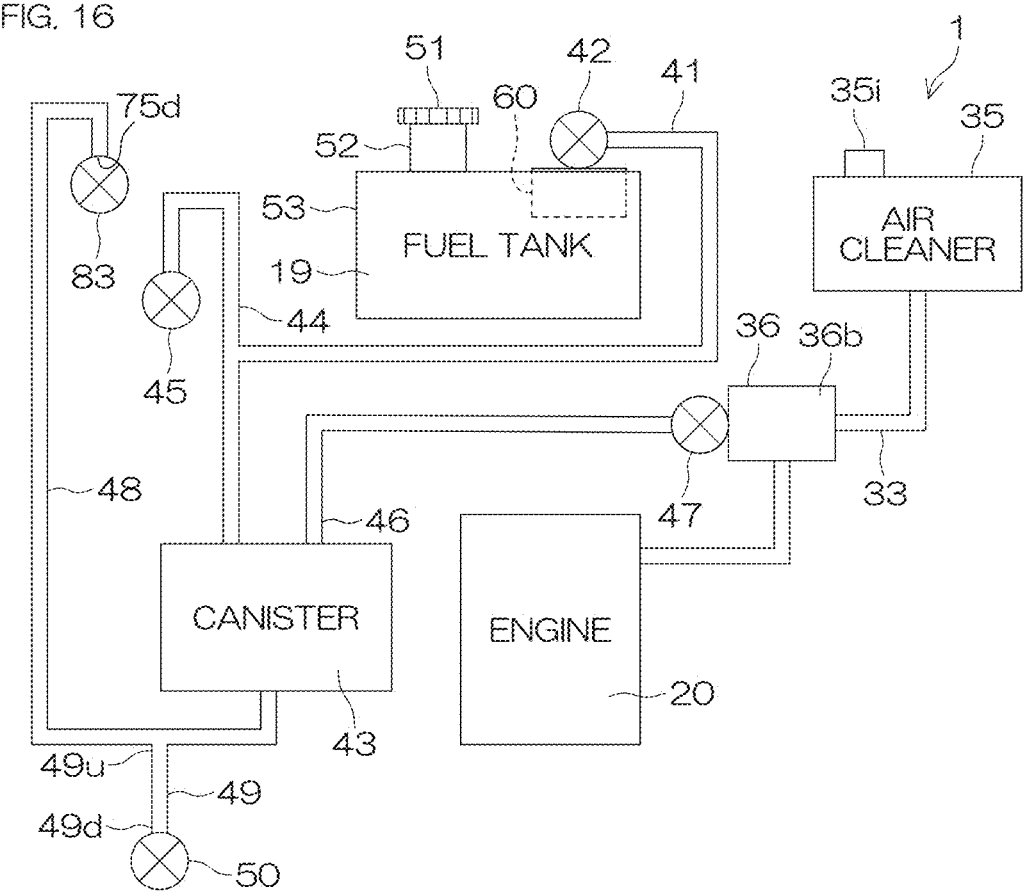
FIG. 16 is a schematic view showing an evaporation system according to another preferred embodiment of the present invention.

The downstream end 75d of the second vent hose 75 may be in contact with the atmosphere via a vent valve 83 arranged to open/close the second vent hose 75, as shown in FIG. 16, instead of being an atmosphere open end for direct contact with the atmosphere. Alternatively, the downstream end 75d of the second vent hose 75 may be in contact with the atmosphere via a filter arranged to remove foreign matter from air flowing through the downstream end 75d of the second vent hose 75 into the second vent hose 75.

As shown in FIG. 16, the rollover valve 42 may be integral with the fuel pump 60. That is, the rollover valve 42 may be directly coupled to the fuel pump 60. Similarly, the purge cut valve 47 may be integral with the throttle body 36b. When the rollover valve 42 is integral with the fuel pump 60, the fuel evaporative emission may be directly supplied from the fuel tank 19 to the rollover valve 42. That is, the first charge hose 62 may be omitted.

Figure 17:
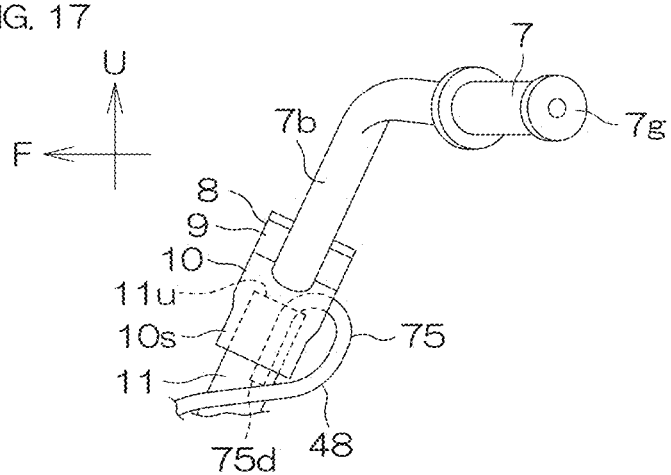
FIG. 17 is a left side view showing that a downstream end of a second vent hose corresponding to a downstream end of a vent hose is disposed inside of a steering shaft.

As shown in FIG. 17, the second vent hose 75 may be inserted in an opening provided in the upper end surface 11u of the steering shaft 11 instead of being inserted in the through hole 81 of the steering shaft 11 (see FIG. 14). In this case, the through hole 81 becomes unnecessary.

The disclosure herein includes the following features (1) to (11). At least one of features (2) to (11) may be added to a straddled vehicle according to feature (1).

Feature (1)

A straddled vehicle including a frame 2, a seat 6, an engine 20, a fuel tank 19, and a canister 43. The frame 2 supports a front wheel Wf and a rear wheel Wr thereon. The seat 6 is fixed to the frame 2. A rider sits on the seat 6. The engine 20 includes a crank shaft 23 arranged to rotate about a rotation axis extending in a left-right direction and is disposed lower than the seat 6. The fuel tank 19 is disposed at a position farther to the front than the seat 6 and higher than the engine 20 and arranged to contain fuel to be supplied to the engine 20. The canister 43 is connected to the fuel tank 19 through the charge hose 41 and arranged to adsorb the fuel evaporative emission generated due to evaporation of fuel in the fuel tank 19. The canister 43 is disposed at a position farther to the front than the rotation axis and lower than the fuel tank 19.

Feature (2)

The straddled vehicle further includes a swing arm 4 disposed farther to the rear than the engine 20, swingably attached to the frame 2, and to which the rear wheel Wr is attached.

Feature (3)

The straddled vehicle further includes a canister cover 82 disposed in a manner sandwiching the canister 43 with the engine 20 and covering at least a portion of the canister 43 from an external lateral side of the straddled vehicle.

Feature (4)

The straddled vehicle further includes a clip 71 disposed laterally at an inner side of the straddled vehicle with respect to the canister cover 82 and arranged to fix the charge hose 41 to the canister 43.

Feature (5)

The straddled vehicle further includes a fuel pump 60 arranged to supply fuel in the fuel tank 19 to the engine 20 and a rollover valve 42 integral with the fuel pump 60 and arranged to shut off the charge hose 41 in response to inclination of the straddled vehicle by a predetermined angle or more with respect to the vertical direction.

Feature (6)

The straddled vehicle further includes a vent hose 48 including an upstream end connected to the canister 43 and a downstream end connected to the canister 43 via the upstream end. The straddled vehicle further includes a vent valve 83 disposed at a position higher than the upper ends of the front wheel Wf and the rear wheel Wr and arranged to open/close the downstream end or a filter disposed at a position higher than the upper ends of the front wheel Wf and the rear wheel Wr and arranged to remove foreign matter from air flowing from the downstream end into the vent hose 48.

Feature (7)

The straddled vehicle further includes an intake passage 33 including an intake opening 35i to suck air and arranged to supply air taken through the intake opening 35i to the engine 20. The downstream end of the vent hose 48 is disposed at a height position equal to or approximately equal to the intake opening 35i or at a height position higher than that height position.

Feature (8)

The straddled vehicle further includes an exterior cover arranged to cover the downstream end of the vent hose 48.

Feature (9)

The straddled vehicle further includes a drain hose 49 disposed lower than the canister 43 and branched from the vent hose 48 to extend downward. The downstream end 49d of the drain hose 49 is disposed at the lower end of the drain hose 49.

Feature (10)

The straddled vehicle further includes a drain valve 50 arranged to prevent backflow of fluid through the downstream end of the drain hose 49 into the drain hole 49.

Feature (11)

The straddled vehicle further includes a throttle body 36b disposed higher than the upper ends of the front wheel Wf and the rear wheel Wr and connected to the engine 20, a purge hose 46 connecting the canister 43 and the throttle body 36b and arranged to supply the fuel evaporative emission in the canister 43 therethrough to the throttle body 36b, and a purge cut valve 47 integral with the throttle body 36b and arranged to open/close the purge hose 46.

Features of two or more of the various preferred embodiments described above may be combined.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
   an engine;
   at least three wheels including a front wheel and a rear wheel;

a fuel tank positioned above the engine to contain fuel to be supplied to the engine;

a seat rearward of the fuel tank and on which a rider sits;

a canister positioned lower than the fuel tank to adsorb fuel evaporative emission discharged from the fuel tank;

a vent hose to supply the canister with air to desorb the adsorbed fuel evaporative emission from the canister; and a drain hose including an upstream end branched from the vent hose and a downstream end positioned lower than the canister.

2. The vehicle according to claim 1, wherein the engine includes a crank shaft to rotate about a rotation axis in response to combustion of fuel; and the downstream end of the drain hose is positioned lower than the rotation axis of the crank shaft.

3. The vehicle according to claim 1, further comprising:

a frame to which the engine is mounted and a swing arm to vertically swing together with the rear wheel with respect to the frame about a rotation axis extending in a left-right direction; wherein the downstream end of the drain hose is positioned lower than the rotation axis of the swing arm.

4. The vehicle according to claim 1, further comprising:

a drain valve attached to the downstream end of the drain hose to discharge fluid that flows out of the drain hose through the downstream end of the drain hose and to prevent fluid from entering the drain hose through the downstream end of the drain hose.

5. The vehicle according to claim 1, further comprising:

a charge hose to guide the fuel evaporative emission discharged from the fuel tank to the canister and a rollover valve on the charge hose to open and close in accordance with a posture of the vehicle; wherein the rollover valve is positioned above the fuel tank; and the fuel tank is recessed downward from an upper surface of the fuel tank and includes an upper recessed portion in which at least a portion of the rollover valve is provided.

6. The vehicle according to claim 5, wherein the upper recessed portion of the fuel tank is recessed downward from the upper surface of the fuel tank and recessed inward in a width direction of the vehicle from a side surface of the fuel tank; and at least a portion of the charge hose is provided in the upper recessed portion.

7. The vehicle according to claim 5, wherein the rollover valve includes an inflow port through which the fuel evaporative emission flows in and an outflow port through which the fuel evaporative emission that has flowed in the inflow port is discharged; and when the posture of the vehicle is that the at least three wheels are on the ground, the inflow port is positioned higher than the outflow port.

8. The vehicle according to claim 5, wherein the charge hose includes a first charge hose extending from the fuel tank to the rollover valve; and when the posture of the vehicle is that the at least three wheels are on the ground, a downstream end of the first charge hose is positioned higher than an upstream end of the first charge hose.

9. The vehicle according to claim 1, further comprising:

a charge hose to guide the fuel evaporative emission discharged from the fuel tank to the canister and a rollover valve provided on the charge hose to open and close in accordance with a posture of the vehicle; wherein the rollover valve includes an inflow port through which the fuel evaporative emission flows in and an outflow port through which the fuel evaporative emission that has flowed in the inflow port is discharged; and when the posture of the vehicle is that the at least three wheels are on the ground, the inflow port is positioned higher than the outflow port.

10. The vehicle according to claim 1, further comprising:

a charge hose to guide the fuel evaporative emission discharged from the fuel tank to the canister and a rollover valve provided on the charge hose to open and close in accordance with the posture of the vehicle; wherein the charge hose includes a first charge hose extending from the fuel tank to the rollover valve; and a downstream end of the first charge hose is positioned higher than an upstream end of the first charge hose.

11. The vehicle according to claim 1, further comprising:

a steering handle to be operated by a rider to steer the vehicle and a cylindrical steering shaft to rotate in response to movement of the steering handle; wherein a downstream end of the vent hose is positioned inside of the steering shaft.

12. The vehicle according to claim 11, wherein the downstream end of the vent hose faces downward on the inside of the steering shaft.

13. The vehicle according to claim 11, wherein the vent hose extends through a through hole that is open at an outer peripheral surface of the steering shaft; and the downstream end of the vent hose is positioned lower than the through hole of the steering shaft.

* * * * *